US010620801B1

(12) United States Patent
Fein et al.

(10) Patent No.: US 10,620,801 B1
(45) Date of Patent: Apr. 14, 2020

(54) GENERATION AND PRESENTATION OF INTERACTIVE INFORMATION CARDS FOR A VIDEO

(71) Applicant: Google Inc., Mountain View, CA (US)

(72) Inventors: Avi Fein, San Francisco, CA (US); Vipul Vinod Thakur, South San Francisco, CA (US); Molly Castle Nix, San Francisco, CA (US); Dhruv Bakshi, Zurich (CH); Edward Cunningham, Zurich (CH); Shmuel Salem, Zurich (CH); Jakob Foerster, Zurich (CH); Anthony William Ruscoe, Horgen (CH); Jacob Paul Richard Robinson, Zurich (CH); Werner Beroux, Thalwil (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/750,753

(22) Filed: Jun. 25, 2015

Related U.S. Application Data

(60) Provisional application No. 62/017,003, filed on Jun. 25, 2014.

(51) Int. Cl.
*G06F 3/0484* (2013.01)
*G06Q 30/02* (2012.01)
(Continued)

(52) U.S. Cl.
CPC ........ *G06F 3/04842* (2013.01); *G06F 3/0482* (2013.01); *G06F 3/04817* (2013.01); *G06Q 30/0257* (2013.01); *G06Q 30/0277* (2013.01)

(58) Field of Classification Search
CPC .......... G06Q 30/02; H04N 21/234318; H04N 21/25891; H04N 21/8133; H04N 21/812; (Continued)

(56) References Cited

U.S. PATENT DOCUMENTS 8,832,746 B2 *  9/2014  Pack ...................... G06Q 30/02
                                                725/44
10,057,628 B2 *  8/2018  Avedissian ........... G06F 3/0481
(Continued)

OTHER PUBLICATIONS

Taggled, http://taggled.tv, Last accessed Jul. 9, 2015, 9 pages.
(Continued)

*Primary Examiner* — Alexander Q Huerta
(74) *Attorney, Agent, or Firm* — Lowenstein Sandler LLP

(57) ABSTRACT

Systems, methods, and interfaces for generating information cards for a video and rendering the information cards during playback of the video are provided. In an embodiment, a client device can an interface component configured to generate a graphical user interface comprising media player configured to play a video streamed to the device from a streaming media provider. The interface further comprises an information icon positioned within the media player and overlaying the video during playing of the video, the information icon indicating association of one or more information cards comprising additional information associated with the video, wherein, the interface component is configured to generate the one or more information cards and include the one or more information cards in the graphical user interface in response to user input indicating selection of the information icon. A presentation component further displays the graphical user interface via a display of the device.

36 Claims, 25 Drawing Sheets

(51) Int. Cl.
*G06F 3/0481* (2013.01)
*G06F 3/0482* (2013.01)

(58) Field of Classification Search
CPC .......... H04N 21/6587; H04N 21/4788; H04N 21/632; H04N 21/4884; H04N 21/236; H04N 21/4316; H04N 21/4722; H04N 21/4126; H04N 21/21805; H04N 21/44222; H04N 21/4312; H04N 21/2543; H04N 21/2187; H04N 21/4516; H04N 21/47205; H04N 21/4756; H04N 21/4828; H04N 21/47815; G06F 3/04842; G06F 3/04817; G06F 3/0482
USPC ... 725/40, 25, 28, 32, 34, 110, 46, 118, 133, 725/132, 47, 62, 87, 14
See application file for complete search history.

(56) References Cited

U.S. PATENT DOCUMENTS

| | | | | |
|---|---|---|---|---|
| 2002/0199187 A1* | 12/2002 | Gissin | .................. | G06F 3/0481 725/32 |
| 2003/0022622 A1* | 1/2003 | Weinblatt | ............... | H04H 20/30 455/3.06 |
| 2003/0028873 A1* | 2/2003 | Lemmons | .......... | H04N 7/17318 725/36 |
| 2003/0192049 A1* | 10/2003 | Schneider | .............. | H04N 7/165 725/51 |
| 2007/0003223 A1* | 1/2007 | Armstrong | ........... | G11B 19/025 386/217 |
| 2008/0255961 A1* | 10/2008 | Livesey | ................. | G06Q 30/02 705/26.8 |
| 2009/0070673 A1* | 3/2009 | Barkan | .............. | H04N 5/44513 715/716 |
| 2009/0276805 A1* | 11/2009 | Andrews, II | ........... | G06Q 30/02 725/35 |
| 2009/0307092 A1* | 12/2009 | Gugliuzza | .............. | G06Q 30/02 705/14.64 |
| 2010/0106660 A1 | 4/2010 | Farmer et al. | | |
| 2010/0251304 A1* | 9/2010 | Donoghue | ......... | H04N 5/44543 725/46 |
| 2011/0162002 A1* | 6/2011 | Jones | ..................... | G06Q 30/02 725/32 |
| 2011/0201388 A1* | 8/2011 | Langlois | ................. | G06F 3/016 455/566 |
| 2012/0167145 A1* | 6/2012 | Incorvia | ............. | H04N 21/4725 725/60 |
| 2012/0167146 A1* | 6/2012 | Incorvia | ........... | H04N 21/23431 725/60 |
| 2012/0206647 A1* | 8/2012 | Allsbrook | ............ | H04N 21/434 348/461 |
| 2012/0209965 A1* | 8/2012 | Rothschild | ............. | G06Q 40/04 709/219 |
| 2013/0014159 A1 | 1/2013 | Wiser et al. | | |
| 2013/0117262 A1* | 5/2013 | Lenahan | ............ | H04N 21/4126 707/736 |
| 2013/0166382 A1* | 6/2013 | Cassidy | ................. | G06Q 30/02 705/14.55 |
| 2014/0351837 A1* | 11/2014 | Amidei | .............. | H04N 7/17318 725/13 |
| 2014/0379469 A1* | 12/2014 | Cipolletta | .......... | G06Q 30/0251 705/14.53 |
| 2015/0074711 A1* | 3/2015 | Spitz | ................ | H04N 21/25866 725/32 |
| 2015/0181271 A1 | 6/2015 | Onno et al. | | |
| 2016/0057508 A1* | 2/2016 | Borcherdt | .......... | H04N 21/2353 715/719 |
| 2016/0261927 A1* | 9/2016 | Smolic | ............... | H04N 21/8133 |
| 2017/0200475 A1* | 7/2017 | Kulas | ................ | H04N 5/44543 |

OTHER PUBLICATIONS

The Mad Video, http://www.themadvideo.com, Last accessed Jul. 9, 2015, 3 pages.
Vidyard, http://www.vidyard.com/, Last accessed Jul. 9, 2015, 6 pages.
Cinsay, http://cinsay.com/, Last accessed Jul. 9, 2015, 9 pages.
Clikthrough, http://new.clikthrough.com/website/, Last accessed Jul. 20, 2015, 5 pages.
"Use dynamic remarketing to show ads tailored to your site visitors," AdWords Help, https://supportgoogle.com/adwords/answers/3124536?hl=en, Last accessed Apr. 25, 2016, 3 pages.
"Enhance your ad with extension," AdWords Help, https://support.google.com/adwords/answer/2375499?hl-en, Last accessed Apr. 25, 2016, 8 pages.

* cited by examiner

US 10,620,801 B1

GENERATION AND PRESENTATION OF INTERACTIVE INFORMATION CARDS FOR A VIDEO

PRIORITY CLAIM

This application claims priority to U.S. Provisional Patent Application No. 62/017,003 filed on Jun. 25, 2014, and entitled "PRESENTATION OF METADATA IN A MEDIA ITEM PLAYER." The entirety of the aforementioned application is incorporated by reference herein.

TECHNICAL FIELD

This disclosure generally relates to systems, methods, and interfaces for generating information cards for a video and rendering the information cards during playback of the video.

BACKGROUND

While online video provides a rich medium to present information to a viewer there is often other information related to the video that may be interesting, but not directly part of the video. For example, a user watching a video about gardening may want to learn more about specific species of plants talked about in the video even though that information is not directly presented in the video. With traditional media viewing services, the user would navigate away from the website or media item player and manually search for the desired information. Thus there is a need to provide viewers with an avenue to access additional information about a video without directing them away from the video service.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
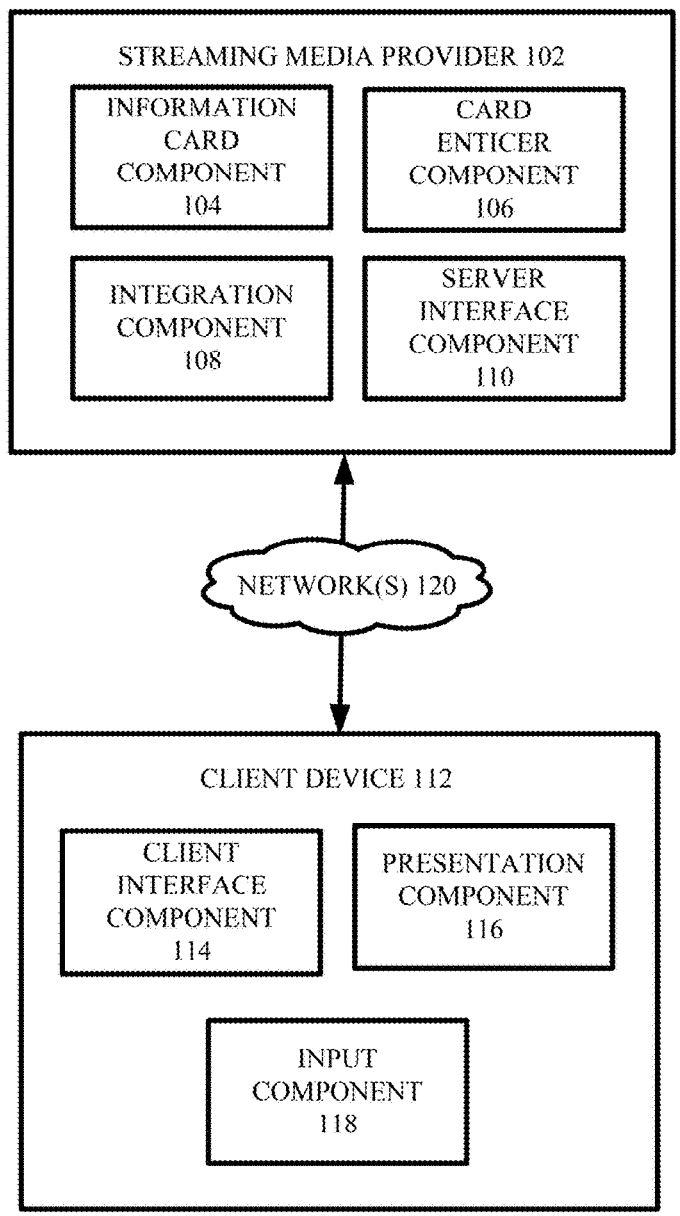
FIG. 1 illustrates an example system for generating information cards for a video and rendering the information cards during playback of the video in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject disclosure is related to systems, methods, and interfaces for generating information cards for a video and rendering the information cards during playback of the video. As used herein, the term information card refers to a data object (e.g., including text, images, video, a hyperlink, etc.) having auxiliary information related to a video that it is associated with. The auxiliary information can be related to the content of the video, a channel that the video is provided on, a creator of the video, an audience of the video, or the like. For example, an information card can include a link to a website with information about a product presented in a video. Another example information card can include information about other videos related to the video being watched or provided on the same channel as the video. Another example information card can include a solicitation for a donation to the video creator.

While online video provides a rich medium to present information to a viewer there is often other information related to the video that may be interesting, but not directly part of the video. For example, a user watching a video about gardening may want to learn more about specific species of plants talked about in the video even though that information is not directly presented in the video. Information cards offer a means for a viewer of a video to be able to learn more about entities in that video without leaving the video player or going to another destination.

The disclosed systems, methods, and interfaces provide a mechanism for enriching a user's media consumption experience by presenting the user with additional information associated with a video that the user may have a desire to view, without interrupting the user's viewing experience and bombarding the user with unwanted and irrelevant information. In various embodiments, after an information card has been created and associated with a video, during playback of the video, a clickable information icon is included within the media player that indicates the association of the information card with the video. The information icon can remain in a consistent fixed position within the media player throughout the playing of the video. In some aspects, the information icon can be configured to be hidden following initial display after a fixed period of time and revealed in response to user input (e.g., cursor movement, hovering over the position of the interface including the information icon, pausing of the video, etc.).

The information card is further rendered only in response to user input indicating a request to view the information card. For example, the information card can be rendered in response to selection of the information icon. The information card is further displayed (e.g., as a video overlay) while the video continues to play and can be removed or minimized in response to user input. Accordingly, the subject mechanisms for providing users with additional information associated with a video minimize a spam environment while creating a more positive user experience. The information icon provides a sufficient hint or visual cue to inform the user that there is deeper information that may be of interest to the user without overloading a user. In addition, in various embodiments, a notification or teaser object can be configured to flash as a flyout from the information icon that includes information (e.g., text) providing an indication of the content of the information card. For example, the notification or teaser for an information card including a link to product included in the video can include text stating "click here to purchase." In an aspect, the notification or teaser can be configured for display for a short predetermined duration of time (e.g., 5 seconds).

The position, size, and appearance of the information card can be adapted based on the type of the client device, the orientation of the client device, and the size of the media player (e.g., full screen vs. partial screen). In an aspect, the information card is rendered within the media player as an overlay over the video content while the video continues to play. According to this aspect, by being inside the player, the information card is easily portable to multiple platforms via embedding. For example, when the video is embedded at a third party site (e.g., a website that does not host the video and/or the information card), by including the information card as metadata with the video for presentation within the video player, the information card can still be rendered when the video is played at the third party site. In another aspect, the information card can be rendered outside of the media player.

The number of information cards associated with a video can vary. In some aspects, when a plurality of information cards are associated with a video, one or more of the cards can be displayed in response to selection of the information icon or another triggering event (e.g., a time point in the video, user interaction with the video, selection of the teaser object, etc.). In an aspect, when a plurality of cards are associated with a video, a condensed representation of the cards can be presented in the form of a gallery. A user can select a condensed representation of one of the cards for to view, thereby bringing that card to the forefront of the display and/or enlarging that card.

The subject information cards can also be associated with specific points or time frames in a video. For instance, an information card promoting a product mentioned in a video could be timed to be brought to the viewer's attention at a point when the product is initially mentioned. In an aspect, the information icon could be displayed or distinguished at that time point or time frame so as to notify the user that an information card is associated with that point or time frame in the video. In another aspect, a teaser object or notification for the information card could be displayed at that time point or time frame in the video.

In an embodiment, a system is provided that facilitates user creation of information cards and/or association of the information cards with a video. For example, they system can allow a creator of a video (or an owner of the video, or entity otherwise having ownership/editing authority of the video) to choose one or more preformed information cards to associate with the video. In another example, the system can allow the creator of the video to design/create information cards for the video. The system can further generate the information cards and associate the information cards with the video based on guided user input such that the information cards provided by the system are consistently formatted and rendered across various platforms.

In an aspect, the system can provide a card creation graphical user interface that includes a menu with different information card types to choose from (e.g., a merchandise card, a fundraising card, a video or playlist card, an associated website card, a fan funding card, a poll card, etc.), wherein each type of card provides a different purpose and represents a different type of content. Each card type can be associated with a card creation form with different input fields that guide the user with selection of content to include in the card. The input fields can vary depending on the card type. Example form fields can include but are not limited to: a title field, a call to action text field, a teaser text field, a product identifier field, an add hyperlink filed, an add image filed, an add video field, or an add poll/survey field. Using the guided form fields, the user can provide the required input and the system can generate the corresponding card with a preconfigured format. In addition, the system can allow the user to associate the card with a specific time point or time frame in the video. For example, the user can choose when an information icon for the card should appear during playback of the video and/or when the teaser/notification for the card should appear during playback of the video.

In other embodiments, a system is provided that can automatically create information cards for a video and/or associate information cards with a video. According to this aspect, the system can determine what information cards to associate with a video and where to associate them, including when to reveal a teaser for the respective information cards during video playback, based on the content of the video, viewer behavior, and/or the type of device being used. The system can further consider user preferences, user context, and user engagement during playback of the video to dynamically determine what information cards to associated with a video, when to associate them and when to reveal teasers/notifications for the respective information cards.

In one or more aspects, a device is disclosed that includes a memory that stores computer executable components and a processor that executes at least the computer executable components stored in the memory. These components include an interface component configured to generate a graphical user interface including a media player configured to play a video streamed to the device from a streaming media provider. The interface further includes the interface an information icon positioned within the media player and overlaying the video during playing of the video, the information icon indicating association of one or more information cards having additional information associated with the video. The interface component is particularly configured to generate the one or more information cards and include the one or more information cards in the graphical user interface in response to user input indicating selection of the information icon. The device further includes a presentation component configured to display the graphical user interface via a display of the device.

In another aspect a server device/system is disclosed that includes a memory that stores computer executable components and a processor that executes at least the computer executable components stored in the memory. These components include an information card component that generates one or more information cards for a video comprising additional information about the video, and an integration component that integrates the one or more information cards with the video for display during playing of the video at a client device. The video is particularly configured for playing in a media player included in a graphical user interface generated at the client device; the graphical user interface having an information icon positioned within the media player overlaying the video during the playing of the video and indicating association of one or more information cards with the video. The integration component of the server device/system further configures the one or more information cards for presentation in the graphical user interface during the playing of the video in response to user input indicating selection of the information icon.

Still in yet another aspect, a method is disclosed that includes receiving, by a system including a processor, user input identifying information related to a video for inclusion in an information card associated with the video, generating, by the system, the information card based on the information, and integrating, by the system, the information card with the video for display during playing of the video at a client device. The video is particularly configured for playing in a media player included in a graphical user interface generated at the client device, the graphical user interface comprising an information icon positioned within the media player overlaying the video during the playing of the video and indicating association of one or more information cards with the video. The method further includes configuring the information card for presentation in the graphical user interface during the playing of the video in response to user input indicating selection of the information icon.

Referring now to the drawings, with reference initially to FIG. 1, presented is a diagram of an example system 100 for generating information cards for a video and rendering the information cards during playback of the video, in accordance with aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes a streaming media provider 102 and a client device 112. Streaming media provider 102 is configured to stream video content to a client device 112 for playback in a media player included in a graphical user interface generated at the client device 112. In some aspects, the graphical user interface and/or the media player is configured and provided by the streaming media provider 102. The streaming media provider 102 and the client device 112 are configured to facilitate rendering of information cards and associated interface elements (e.g., the information icon, a teaser, etc.) for the video in association with playback of the video. Streaming media provider 102 and client device 112 operate in client/server relationship wherein streaming media provider 102 employs one or more server devices to provide the streaming media content and related services to client device 112 via a network 120 in response to a request made by the client device 112 for such content and/or services from the streaming media provider 102. Generally, streaming media provider 102 and client device 112 can include memory (not shown) that stores computer executable components and a processor (not shown) that executes the computer executable components stored in the memory, examples of which can be found with reference to FIG. 24.

The various components of system 100 can be connected either directly or via one or more networks 120. Such network(s) can include wired and wireless networks, including but not limited to, a cellular network, a wide area network (WAD, e.g., the Internet), a local area network (LAN), or a personal area network (PAN). For example, client device 112 can communicate with streaming media provider 102 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

In various embodiments, streaming media provider 102 is an entity configured to provide various type of streaming media and related services that are accessed by client devices (e.g., client device 112) via a website or thin client application employed by the streaming media provider 102.

The website and/or thin client application employed by the streaming media provider 102 can provide a dynamic graphical user interface via which respective users can interface with the streaming media provider 102. For example, the dynamic graphical user interface can include at least a media player configured to play a video provided by (e.g., hosted by) the streaming media provider 102, and display one or more interactive information cards and associated interface elements as described herein. Client device 112 can include a presentation component 116 to facilitate rendering or presentation of the dynamic graphical user interface at a display of the client device 112.

In an exemplary embodiment, the streaming media provider 102 provides users access to a voluminous quantity (and potentially an inexhaustible number) of shared media (e.g., video and/or audio) files. The streaming media provider can receive media (e.g., user generated content) uploaded thereto by respective users of the streaming media provider and publish the uploaded media to other users. The streaming media provider can further stream these media files to one or more users at their respective client devices (e.g., client device 112) using network accessible platform (e.g., via a website or thin client application). The media can be stored in memory accessible to streaming media provider 102 (e.g., at various servers or caches employed by the streaming media provider 102). In addition, the streaming media provider can allow users to establish their own channels which serve as avenues via which they share their own media content (e.g., media created, collected or otherwise associated with ownership by the user). Other users of the streaming media provider can subscribe to desired channels to receive information regarding the channels, such as new videos added to the channels, recommended videos from the channels, comments provided by other users in association with the channels, etc.

As used herein, the term channel refers to data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

The term media content or media item can include but is not limited to streamable media (e.g., video, live video, video advertisements, animations, music, music videos, sound files and etc.) and static media (e.g., pictures, thumbnails). The term media content or media item also includes a collection of media items such as a playlist including several videos or songs, or a channel including several videos or songs associated with a single media creator or curator.

Client device 112 can include any suitable computing device associated with a user and configured to receive content and/or services from streaming media provider 102 via a network. For example, a client device 112 can include a desktop computer, a laptop computer, a television, an Internet enabled television, a mobile phone, a smartphone, a tablet personal computer (PC), a personal digital assistant PDA, or a wearable computing device. As used in this disclosure, the terms "content consumer" or "user" refer to a person, entity, system, or combination thereof that employs system 100 (or additional systems described in this disclosure) using a client device 112.

In accordance with various embodiments, to facilitate generating information cards for a video and rendering the information cards during playback of the video, streaming media provider 102 can include information card component 104, card enticer component 106, integration component 108, and server interface component 110. Information card component 104 is configured to generate and/or provide one or more information cards for a video having additional information about the video. The information card can serve various purposes, such as informing the viewer about content presented in the video, offering the user an avenue to purchase an item mentioned or presented in the video, providing information about additional videos or playlists associated with the video, providing the user with a link to a website with additional information associated with the video, etc. An information card can include text, images, links, video, audio and/or animation.

In one or more embodiments, information card component 104 is configured to generate and/or provide a predefined set of information card types, including but not limited to: a merchandise card, a fundraising card, a video or playlist card, an associated website card, a fan funding card, and an a survey card. A merchandise card can promote licensed merchandise directly from the video. For example, a merchandise card can include a link a website where the user can purchase merchandise mentioned in the video and include an image of the merchandise. A fundraising card can provide viewers with a link directly to projects on fundraising sites promoted by the video creator and/or the streaming media provider. For example, a fundraising card can include a link to a source where the user can contribute to a fundraising project associated with the video.

A media card can provide a link to another video, playlist or channel hosted by the streaming media provider 102 which can be of interest to the viewer of the current video. For example, a media can include a thumbnail image for another video or playlist and include a destination URL for the video or playlist at the streaming media provider. In some aspects, a media card can include a link to a specific time in a video or to an individual video in a playlist. An associated website card can be used to provide a direct link to a website associate with a video. A fan funding card can allow viewers/fans to show their appreciation for the video or the channel/creator of the video by allowing the viewer to make a monetary contribution directly on the video page. A survey card can include an interactive survey associated with the video. A survey card can provide a means for a video creator to collect solicited feedback from viewers. For example, a video creator could use a survey card to ask viewers what the theme or title of the next video should be. In another example, a video creator could use a survey card to ask viewers to provide a rating of the video.

Figure 2:
FIG. 2 presents an example information cards in accordance with various aspects and embodiments described herein.

FIG. 2 presents a variety of example information cards in accordance with various aspects and embodiments described herein. Information card 202 provides an example associated website information card. The website information card 202 includes a representative image, a title (Nutritional Facts), a call to action text ("see the nutritional facts), and a hyperlink to the website (tastenutrients.com). In an aspect, this website information card is associated with a cooking video demonstrating preparation of a particular food item. The website information card 202 provides a link to the website where the viewer can get nutritional facts for the food item.

Information card 204 is an example, fundraising information card. The fundraising card 204 also includes a representative image, a title (Soldiers Unite), a call to action text (contribute to Indino), and a link to the Indino website (Indino.com). In an aspect, this fundraising card is configured for rendering during a news video regarding a recent military program. Information card 206 is an example video information card. Video information card 206 includes a thumbnail image representative of a video entitled "Coconut Oil Health Benefits." The thumbnail image also functions as a hyperlink to the video, wherein selection of the hyperlink begins playing of the video at time marker 7:25. The video information card also includes call to action text "Learn all about coconut oil," and other information about the video (e.g., the creator Life Foods, number of views, etc.). In an aspect, this video information card is associated with another video provided by Life Foods, such as video related to a recipe using coconut oil.

Information card 208 is another example video information card for a live video entitled "Quantum Quest." In an aspect, information card 208 can be shown on other non-live videos provided by Science Man to inform fans regarding the playing of the live video. Information card 210 provides an example playlist information card. This playlist information card provides users with a hyperlink to a playlist entitled "Suf Nica Favorites" that includes a compilation of different surfing videos from Nicaragua. In an aspect, this playlist video card 210 is configured for rendering on another surfing video provided by Sol Searcher.

With reference back to FIG. 1, in an aspect, information card component 104 can automatically generate information cards for a video based on information associated with the video, such as information identifying a creator of the video or a channel of the video. For example, information card component 104 can generate a video card that promotes another video provided by the creator or included on the creator's channel. In another example, information card component 104 can automatically generate a website promotion card that promotes a website affiliated with the channel creator as gathered base on information from the channel creator's profile. In another aspect, the information card component 104 can automatically generate a playlist card that compiles a playlist of other videos provided on the creator channel. In another aspect, information card component 104 can automatically generate information cards that facilitate cross-promotion between channels. For example, when two channel curators have agreed to allow cross promotion between their channels, information card component 104 can generate an information card that advertises or promotes the first channel for display on videos of the second channel, and vice versa.

In some aspects, information card component 104 can automatically generate information cards for a video based on metadata associated with the video, such as metadata identifying key terms or content in the video, metadata identifying a title of the video, metadata identifying a genre of the video, etc. For example, information card component 104 can be configured to identify merchandise information cards for items mentioned or presented in a video based on metadata associated with the video identifying those items.

In other aspects, information card component 104 is configured to generate information cards for a video based on and in response to user input identifying the content for the information card. These aspects of information card component 104 are discussed in greater detail infra with reference to FIGS. 14-19.

Card enticer component 106 is configured to generate a concise statement, question, phrase, or other form of information (e.g., an image, an icon, an animation, etc.), referred to herein as the "teaser," that that serves as an indication of the content of an information card. For example, when an information card is a fan funding card that facilitates receiving donations from fans, a suitable teaser could state "Support [name of video creator] here." The teaser is designed to be displayed prior to the displaying of the information card. The teaser is clickable, and in response to selection of the teaser, the card associated therewith is revealed. In an aspect, the teaser is configured to be flashed for a short duration of time (e.g., 5 seconds) at or near (e.g., as a fly out) the information icon displayed in the media player during the playing of a video. The purpose of the teaser is to provide the viewer with an additional cue (in addition to the information icon), that an information card is associated with the video, and to provide an indication as to what the information card is about. The teaser can also entice the viewer to select the information card. In an aspect, when an information card is associated with a particular point or segment of a video, the teaser is configured to be presented at that particular point and/or segment.

In various embodiments, card enticer component 106 is configured to generate teasers based on user provided input identifying the content/text for the teaser. Such embodiments are discussed in greater detail infra with respect to FIGS. 14-19. In some embodiments however, card enticer component 106 can automatically generate an appropriate teaser for an information card. For example, card enticer component 106 can be configured to combine a suitable call to action term (e.g., donate, watch, share, purchase, etc.) with another term representing the content or purpose of the card to generate a teaser. In other aspects, card enticer component can employ a set of stock teasers that are generally appropriate for different card types. For example, a stock teaser for a merchandise card could read "click here to purchase." In another example, a stock teaser for a fundraising card could read, "Donate now."

In an embodiment, card enticer component 106 is configured to personalize teasers for each particular viewer. For example, the card enticer component 106 can integrate the viewer's name into the teaser (e.g., "Erin, Watch this Video," as opposed to "Watch this Video"). In another example, card enticer component 106 can draw on information included in a viewer's watch history and interaction with the streaming media provider 102 to facilitate personalizing teasers. For instance, card enticer component 106 can learn that based on a user's previous contributions, an additional contribution of the user to the particular channel curator associated with a video would place the user in a higher status or win the user an honor or badge of some sort. Accordingly, card enticer component 106 can generate a personalized teaser for a fan funding card that states, "Erin, contribute to this channel and receive Gold status."

In another aspect, the card enticer component 106 can include relevant and authorized social annotations with a teaser to facilitate enticing a viewer to select the teaser and view the associated card. For example, a teaser with a personalized touch and social annotation could state "Erin, watch this video your friends John and Amy liked," or "Erin, buy this necklace Jaime wore to the party last week" (e.g., as discerned from information, such as pictures, comments, etc., published on an Jaime's social network profile page).

Integration component 108 is configured to integrate information cards and their associated teasers into a video for display during playing of the video. The integration component 108 configures the information cards for presentation in response to user input indicating selection of the information icon or the associated teaser presented in the media player. In some embodiments, discussed infra, the integration component 108 can determine or infer what information cards to associate with a video and where to reveal them and/or their associated teasers based on user behavior, user context, user preferences, user profile information, and/or user engagement. The integration component 108 can further store information (e.g., in memory accessible to streaming media provider 102) defining what information cards are associated with a particular video, the teasers associated with the respective information cards, and/or the locations (e.g., video frames) the respective information cards are associated with. When the video is requested for playback, the integration component 108 and/or the server interface component 110 can provide the information cards to the client device 112 during playback of the video for presentation where appropriate (e.g., when the information icon is selected or their teasers are selected, when the information cards are respectively selected, etc.).

In an aspect, the integration component 108 can dynamically, determine or infer what information cards to associate with a video and where to reveal them and/or their associated teasers in real-time or substantially real-time during playback based on user behavior, user context, user preferences, user profile information, and/or user engagement. According to this aspect, what information cards are presented to a user and when during playback of a video are personalized on a per user basis. In other aspects, discussed in greater detail infra, a user (e.g., a creator of the video), can determine what information cards to associate with a video and where to include them. According to this aspect, the user can create his or her own information cards and/or teasers or select a information card that was automatically created by information card component 104. In some aspects, the user can also set a duration for the amount of time a particular teaser is revealed. In other aspects, the duration for presentation of a teaser is controlled by streaming media provider 102 (e.g., 5 seconds total).

In various embodiments, the integration component 108 incorporates information cards and their associated teasers into a video as metadata included with or associated with the video file. According to this embodiment, when the streaming media provider 102 streams streams the video to the client device 112 for playback, the metadata including the information cards associated with the video and their associated teasers is also provided. The metadata can further define the points/time frames in the video the respective information cards are to be made available, and/or the teasers for the respective information cards are to be shown. With this embodiment, the information cards associated with a video and/or their locations within the video can be preset prior to playback of the video.

To facilitate rendering the subject information cards in association with playback of a video provided by streaming media provider 102, client device 112 can include client interface component 114, presentation component 116, and input component 118. In one or more embodiments, client interface component 114 is configured to generate a graphical user interface including at least a media player configured to play a video streamed to the device from streaming media provider 102. For example, the client device 112 can access a website hosted by the streaming media provider 102 or open a resident thin client application serviced by the streaming media provider 102, and select a video for playing. In response to selection of the video, client interface component 114 can generate a graphical user interface configured by the streaming media provider (e.g., via server interface component 110) that includes a media player that begins playing the requested video. In another example, client device 112 can access another network source (not shown), such as a website provided by a social networking service and generate a graphical user interface configured by the social networking service. According to this example, the graphical user interface can include a having a feed with an embedded video provided by the streaming media provider 102.

In association with generation of the graphical user interface, and based on association of one or more information cards with the video, client interface component 114 can include an information icon positioned within the media player and overlaying the video. The information icon indicates the association of the one or more information cards the video. In an aspect, the information icon can remain visible throughout the duration of playing of the video. In another aspect, the information icon can become visible in response to a trigger, such as cursor movement, hovering of a cursor near an area where the information icon generally appears, in response to presentation of a teaser, in response to occurrence of a frame in the video associated with a particular information card, etc.

Figure 3:
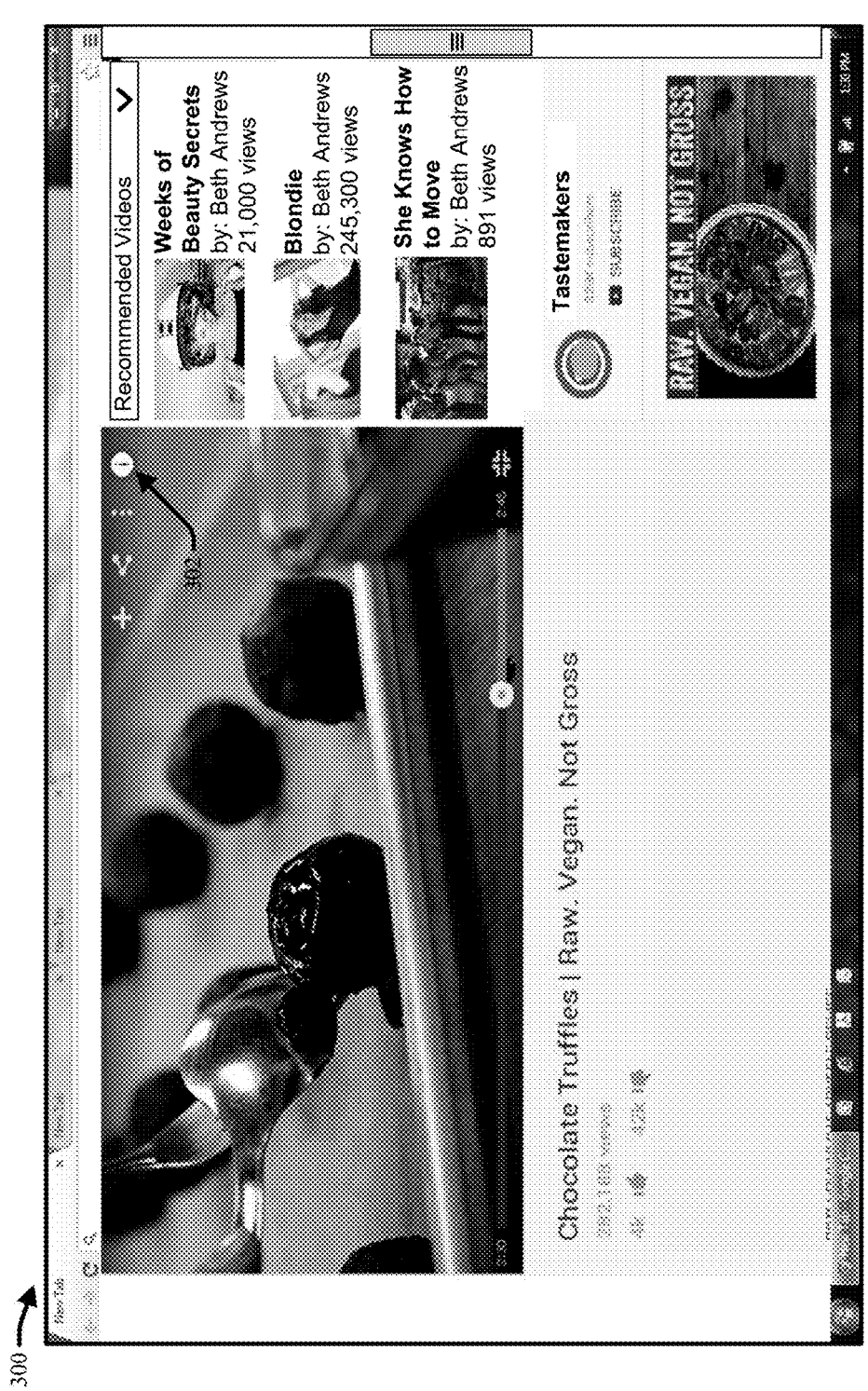
FIG. 3 presents an example user interface that facilitates rendering information cards during playback of a video in accordance with various aspects and embodiments described herein.

For example, FIG. 3 depicts an example graphical user interface 300 provided by streaming media provider 102 and presented at client device 112 in association with access of the streaming media provider. The graphical user interface includes a video currently being played entitled "Chocolate Truffles, Raw. Vegan. Not Gross." This video has at least one information card associated therewith, as indicated by the information icon 302 displayed in the upper right corner of the media player as an overlay over the video. In various embodiments, the client interface component 114 is configured to surface the one or more information cards associated with the video and include the one or more information cards in the graphical user interface in response to user input (e.g., provided via input component 118) indicating selection of information icon 302.

Figure 4:
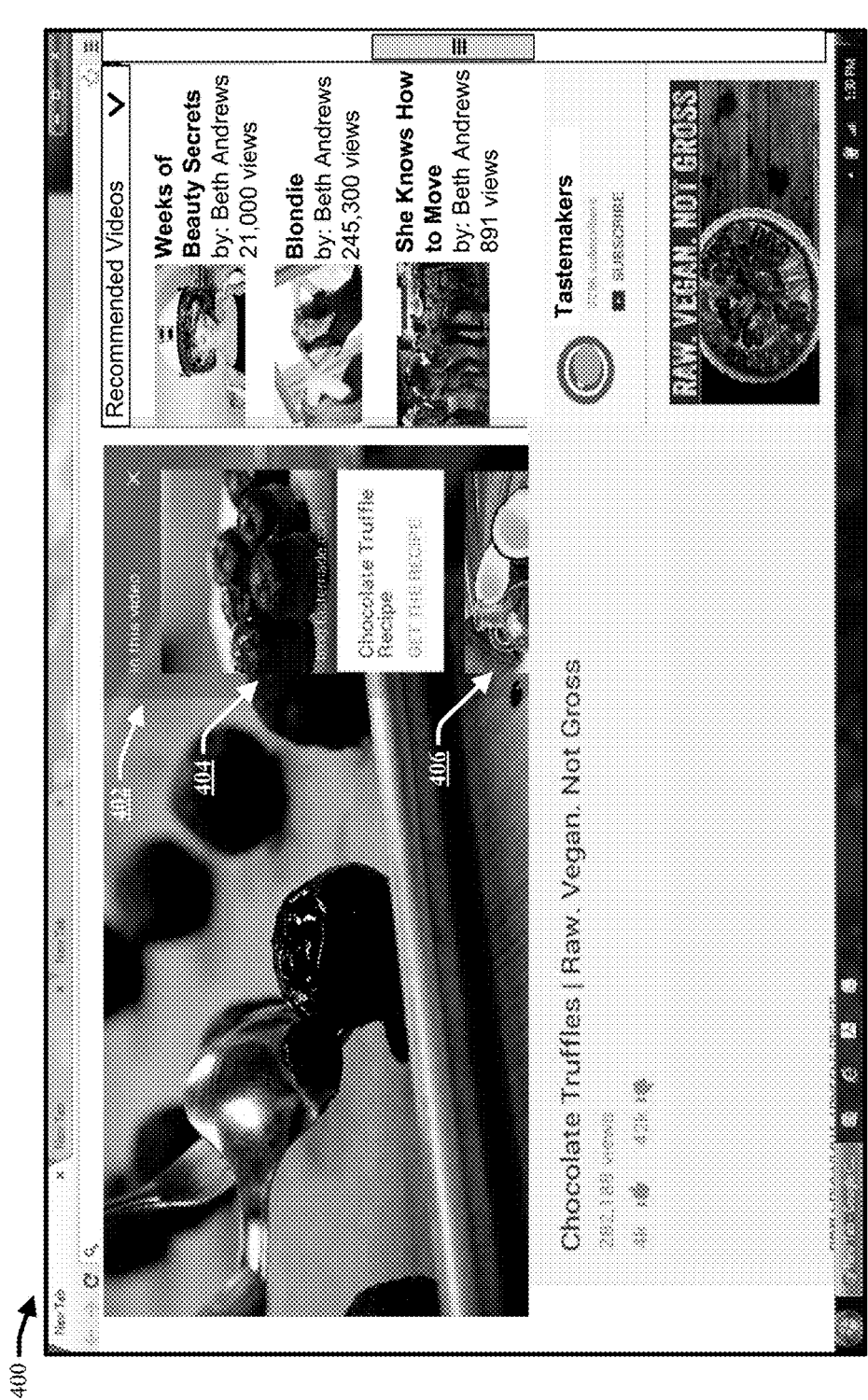
FIG. 4 presents another example user interface that facilitates rendering information cards during playback of a video in accordance with various aspects and embodiments described herein.

For example, FIG. 4 shows an example graphical user interface 400 provided by streaming media provider 102 that is displayed at client device 112 in response to user input indicating selection of information icon 302. The graphical user interface includes an information card window 402 with text stating "in this video," to introduce the information cards that are included in the video. This video includes at least two information cards, information cards 404 and 406. Only a portion of information card 406 is displayed within the information card window 402. In an aspect, the remainder of information card 406 can be revealed in response to scrolling through the information card window 402. For example, additional information cards (e.g., in addition to information cards 404 and 406, may be revealed in response to scrolling).

With this example interface, the information cards 404 and 406, and the information card window 402 are included as an overlay over the video and within the media player. The information cards and the information card window are positioned at a right side of the media player so not as to obstruct the entire visible display area of the media player. Accordingly, the user can continue watching the video while the information card are displayed. The user can also dismiss the information cards at will (e.g., via selecting the X icon in the upper right corner of the information card window 402).

Example interfaces 300, 400 and other interfaces described herein are considered dynamic graphical user interfaces. As used herein, a dynamic graphical user interface is an interface whose elements dynamically change in response to user input, user navigation of the interface, the occurrence of various events or actions, the passage of time, user context, and other conceivable factors. In an aspect, presentation component 116 can present or render a dynamic graphical user interface employed by the streaming media provider in response to opening of a website of the streaming media provider 102, or in response to opening of a client application of the streaming media provider. The dynamic graphical user interface can include various elements that facilitate interfacing with the streaming media provider 102 in order to receive the content and/or services provided thereby.

In some embodiments, the streaming media provider 102 controls the changing appearance of the dynamical graphical user interfaces described herein (e.g., the rendering of information cards and associated interface elements). For example, a dynamic graphical user interface presented at client device 112 via presentation component 116 (e.g., interfaces 300, 400 and the like) can include a server-side dynamic webpage/application page. A server-side dynamic webpage is a webpage whose construction is controlled by an application server processing server-side scripts. In server-side scripting, parameters determine how the assembly of every new web page proceeds, including the setting up of more client-side processing.

According to this aspect, streaming media provider 102 can include server interface component 110 to generate scripts that define the elements of each instance of the dynamic graphical user interface. Such scripts can control the look and feel of the dynamic graphical user interface, including when and where an information icon is displayed, when and where a teaser/notification is displayed, when and where an information card is displayed, how an information card appears, etc. As the elements of the dynamic graphical user interface change, such as in response to requests/input received from the client device 112, server interface component 110 can generate new scripts that redefine the current elements of the dynamic graphical user interface. Server interface component 110 can further provide the scripts to the client device 112 for interpretation and generation/presentation of the dynamic graphical user interface by presentation component 116.

In another aspect, a dynamic graphical user interface presented at client device 112 via presentation component 116 (e.g., interfaces 300, 400 and the like) is a client-side dynamic webpage/application page. A client-side dynamic web page processes the web page using hypertext markup language (HTML) scripting running in the browser as it loads. According to this aspect, client device 112 can include client interface component 114 to use client-side scripting to change the elements/behaviors of the dynamic user interface presented by presentation component 116 in response user input (e.g., mouse, keyboard, touchscreen, vocal commands, etc.) via input component 118, and/or at specified timing events. In this case the dynamic behavior occurs within the presentation.

In yet another aspect, a dynamic graphical user interface presented at client device 112 via presentation component 116 (e.g., interfaces 300, 400 and the like) is produced as a result of combined server-side and client-side processing. According to this aspect, server interface component 110 is configured to provide the server-side processing and client interface component 114 is configured to provide the client-side processing necessary to generate and present the subject dynamic graphical user interface. The client and server components that collectively build a dynamic web page/application page are called a web application. Web applications manage user interactions, state, security, and performance. For example, Ajax programming uses a combination of both client-side scripting and server-side requests. It is a web application development technique for dynamically interchanging content, and it sends requests to the server for data in order to do so. The server returns the requested data which is then processed by a client side script. This technique can reduce server load time because the client does not request the entire webpage to be regenerated by the server's language parser; only the content that will change is transmitted.

The manner in which information cards and associated interface elements (e.g., the information icon, teasers, etc.) are presented in a graphical user interface can vary. For example, streaming media provider 102 and/or client device 112 can determine and adapt (e.g., via integration component 108, server interface component 110, client interface component 114, and/or presentation component 116) the size, shape, location, elements (e.g., images, text, icons, etc.), and appearance of an information card, an information icon, and a teaser included in a graphical user interface based on various factors, including but not limited to: client device type (e.g., smartphone, tablet, laptop PC, smart TV, etc.), client device orientation (e.g., portrait vs. landscape), media player dimensions (e.g., full screen vs. partial screen), location of the media player (e.g., embedded at a location external to streaming media provider 102, rendered on a webpage employed by the streaming media provider, rendered via a thin client application employed by the streaming media provider, etc.), type of the information card, content of the information card (e.g., text, images, hyperlinks, etc.), type of teaser, content of the teaser, and number of information cards associated with the video.

In various embodiments, the server interface component 110 (and/or the integration component 108), and/or the client interface component 114 is configured to integrate one or more information cards associated with a video in the graphical user interface as an overlay over the video and within the media player during playing of the video. In other embodiments, the server interface component 110 (and/or the integration component 108), and/or the client interface component 114 is configured to integrate the one or more information cards in the graphical user interface outside of the media player during playing of the video.

FIGS. 5-13 present additional example dynamic graphical user interfaces including information icons, teasers, and/or information cards in accordance with various aspects and embodiments described herein. Repetitive description of like elements described in respective embodiments described herein is omitted for sake of brevity.

Figure 5:
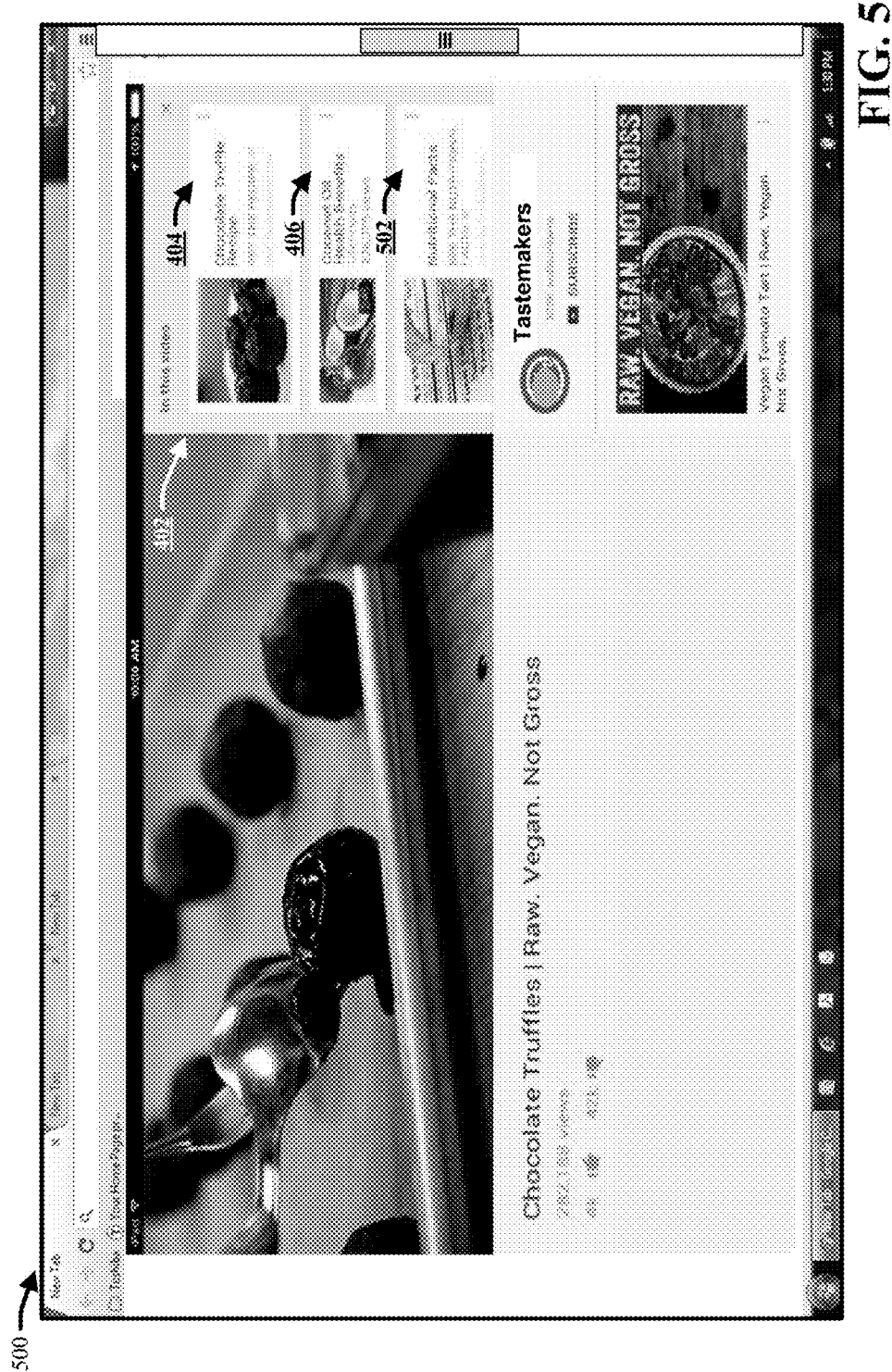
FIG. 5 presents another example user interface that facilitates rendering information cards during playback of a video in accordance with various aspects and embodiments described herein.

With reference to FIG. 5 presented is another example graphical user interface 500 provided by streaming media provider 102 that is displayed at client device 112 in response to user input indicating selection of information icon 302. Interface 500 is similar to interface 400 with the modification of the location of the information card window 402 and the orientation of the information cards included within the information card window. In example interface 500, the information card window 402 is located outside of the media player and the information cards are provided in a horizontal or landscape orientation. With this configuration, an additional information card 502 is capable of being included within the visible display area of the information card window.

In an aspect, presentation component 116 (and/or client interface component 114) is configured to render interface 300 or interface 400 depending on the type of client device employed (e.g., a desktop PC, a laptop PC, a smart TV, tablet, a smartphone, etc.), the orientation of the client device, and/or the size of the media player (e.g., full screen vs. partial screen).

Figure 6:
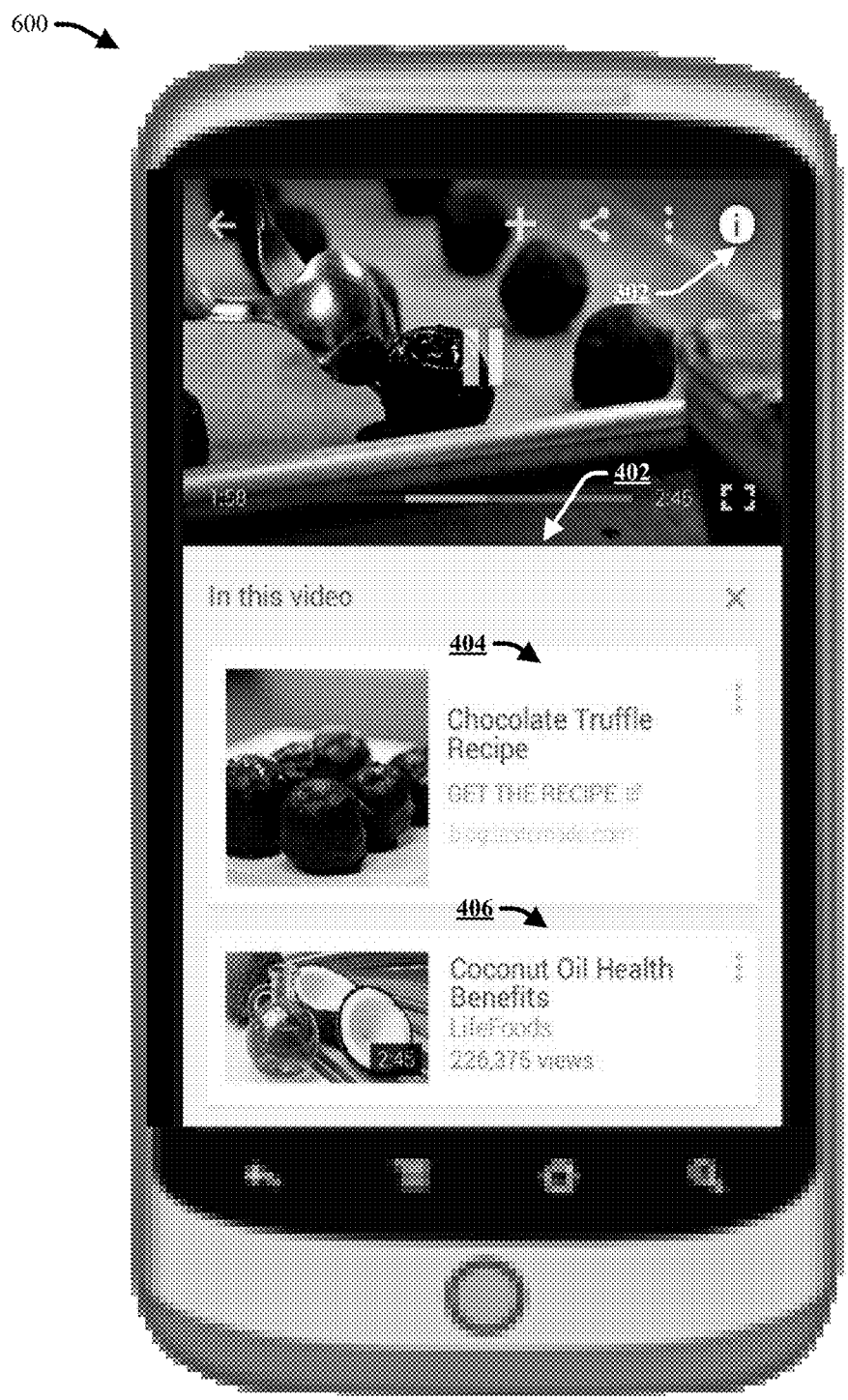
FIG. 6 presents another example user interface that facilitates rendering information cards during playback of a video in accordance with various aspects and embodiments described herein.

FIG. 6 presents another example graphical user interface 600 provided by streaming media provider 102 that is displayed at client device 112 in accordance with various aspects and embodiments described herein. Interface 600 depicts an example interface for display at a smartphone device or tablet when held in a vertical orientation. Interface 600 includes a media player that has a paused video with an information icon 302 displayed in the upper right hand corner of the media player. The interface further includes an information card window 402 displayed below the media player with information cards 404 and 406 in a horizontal or landscape orientation.

Figure 7:
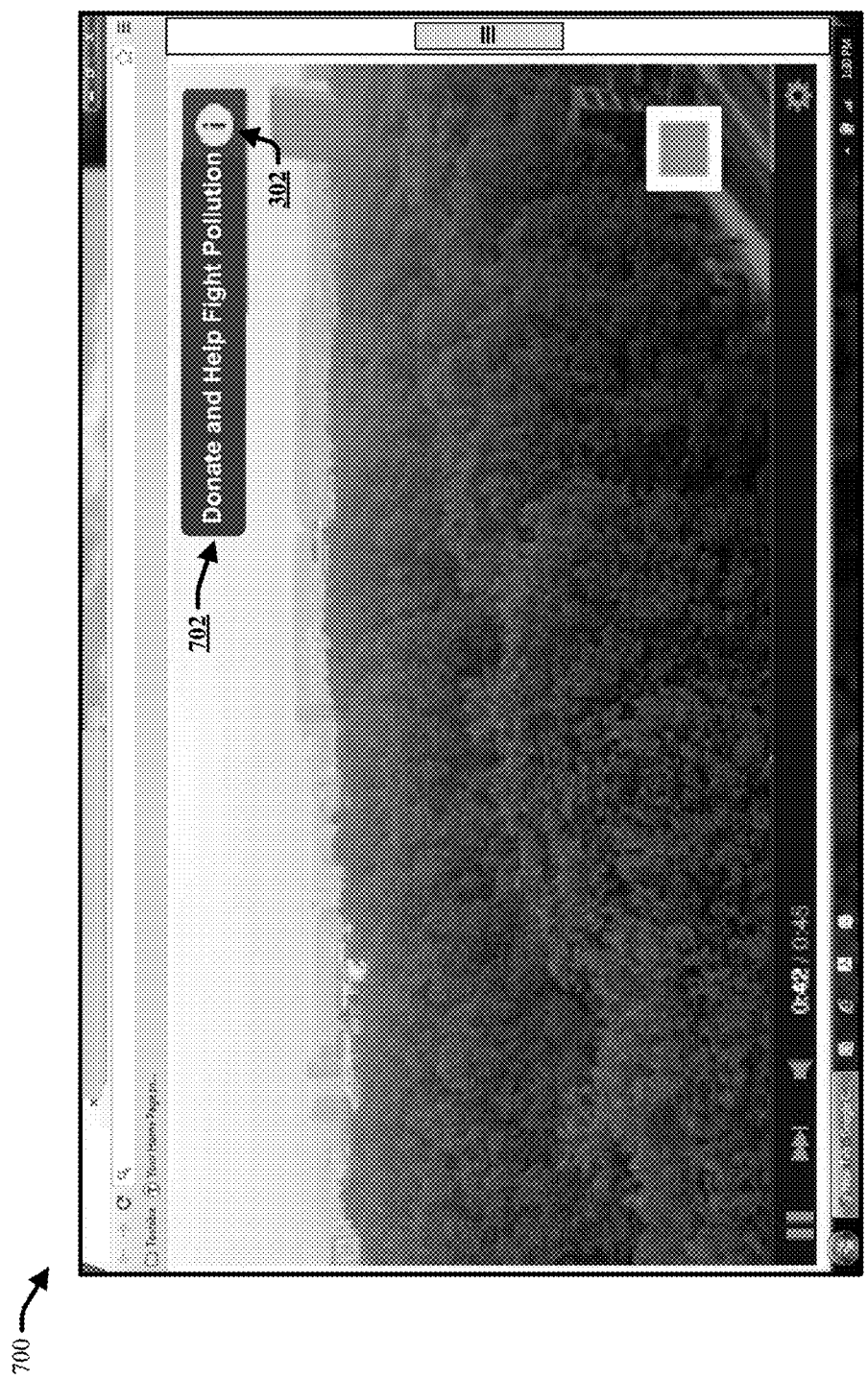
FIG. 7 presents another example user interface that facilitates rendering information cards during playback of a video in accordance with various aspects and embodiments described herein.

FIG. 7 presents another example graphical user interface 700 provided by streaming media provider 102 that is displayed at client device 112 in accordance with various aspects and embodiments described herein. Interface 700 depicts an example interface including a teaser 702 displayed as an overlay over a vide during the playing of the video. The teaser is displayed as a flyout from the information icon 302. The teaser states "donate and help fight pollution," indicating that it represents a fundraising information card. In response to selection of the teaser 702, the fundraising information card will be rendered in the interface 700. In an aspect, the teaser is configured for display for a predetermined duration of time. After passage of the predetermined duration of time, the teaser 702 is dismissed or removed from the interface. In an aspect, the teaser was configured to be displayed at time 0:42 in the video.

Figure 8:
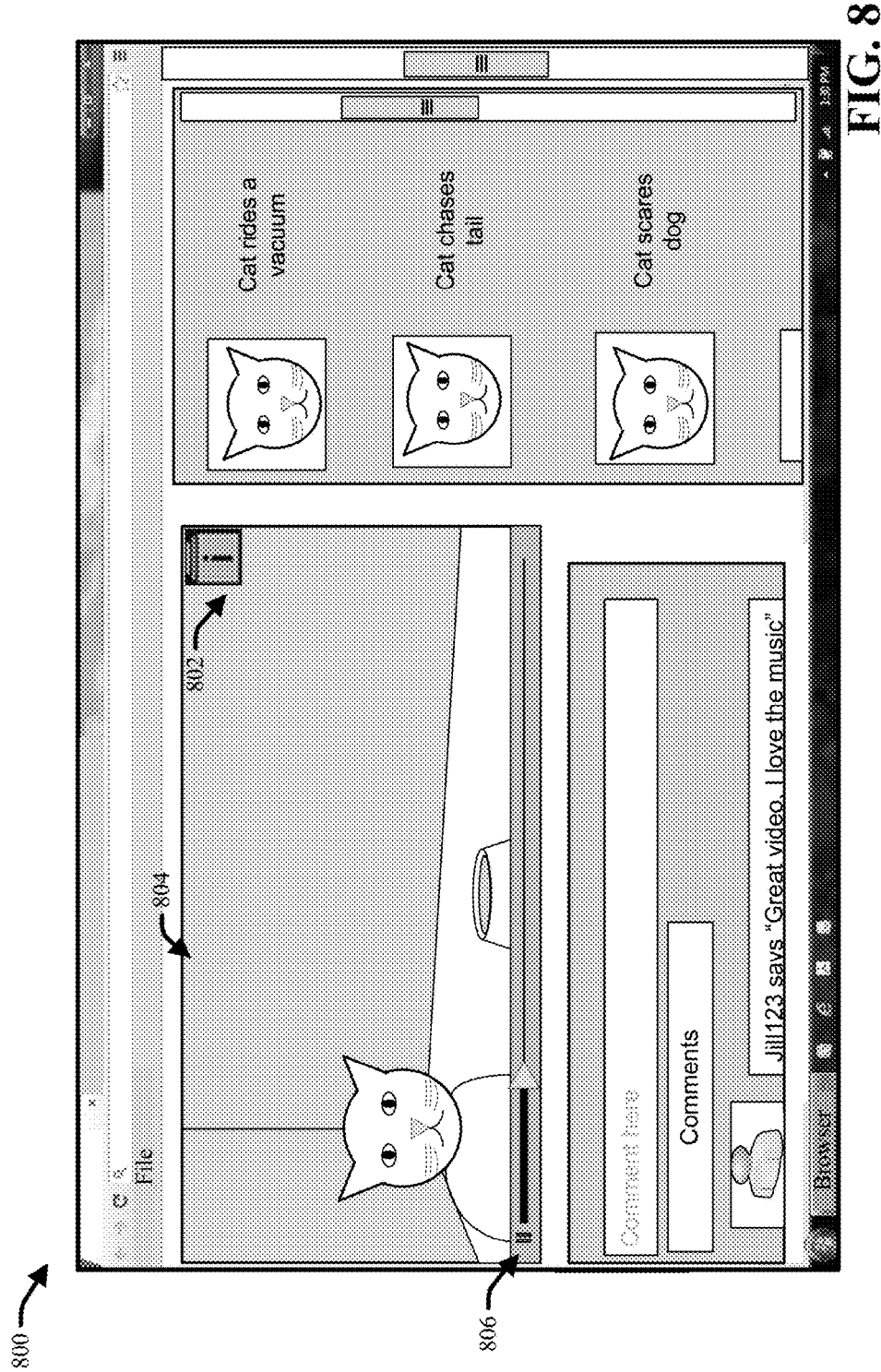
FIG. 8 presents another example user interface that facilitates rendering information cards during playback of a video in accordance with various aspects and embodiments described herein.

FIG. 8 presents another example graphical user interface 800 provided by streaming media provider 102 that is displayed at client device 112 in accordance with various aspects and embodiments described herein. Repetitive description of like elements employed in respective embodiments described herein is omitted for sake of brevity.

Interface 800 includes a media player 804 that is currently playing a cat video. The media player 804 includes playback controls 806 and information icon 802. The playback controls 806 can provide conventional media player interactivity, such as allowing the user to control playing of the video, pausing, stopping, restarting, fast forwarding, rewinding, and the like. In various aspects, client interface component 114 and/or server interface component 110 can determine when and how to display information icon 802. For instance, client interface component 114 and/or server interface component 110 can render/generate information icon 802 in response to a determination that an information card is associated with the video.

In various embodiments, client interface component 114 and/or server interface component 110 can alter (initiate rendering, hide, disable rendering, alter level of opaqueness, etc.) how the information icon 802 is rendered in response to a triggering event(s). For example, when a user navigates to a website or initiates playback of a media item, the media player can display information icon 802 at a highest level of visibility (e.g., low or no opaqueness). In other embodiments, information icon 802 can be rendered based on user actions, such as a user hovering over the media player 804 (e.g., via a computer mouse, etc.), a user providing input (e.g., clicking an area of interface 800, scrolling interface 800, etc.), or the like. It is noted that the triggering event can be based on other criteria, such as a passage of time, entering a playback period, or the like.

As an example, information icon 802 can be hidden during playback times that are not associated with information cards and rendered when an information card is associated with a playback period. When the playback period associated with the information card ends, the information icon 802 can be hidden. It is noted that any combinations of triggering events can be utilized. For example, information icon 802 can be rendered based on user input, a playback time, and the like. In another aspect, information icon 802 can be hidden based on not receiving user actions for a determined period of time, in response to a user manually hiding information icon 802, or the like. In embodiments, a level of opaqueness associated with information icon 802 can gradually alter (e.g., fade information icon 802). For instance, if a user does not select information icon 802 for a period of time, information icon 802 can gradually fade until information icon 802 is no longer visible.

Information icon 802 can be a selectable control. In response to selection thereof, the client interface component 114 and/or server interface component 110 can initiate a rendering of one or more information cards. In an aspect, the information cards can be rendered in a gallery of available information cards, individual (e.g., as a full size information card), or the like.

Figure 9:
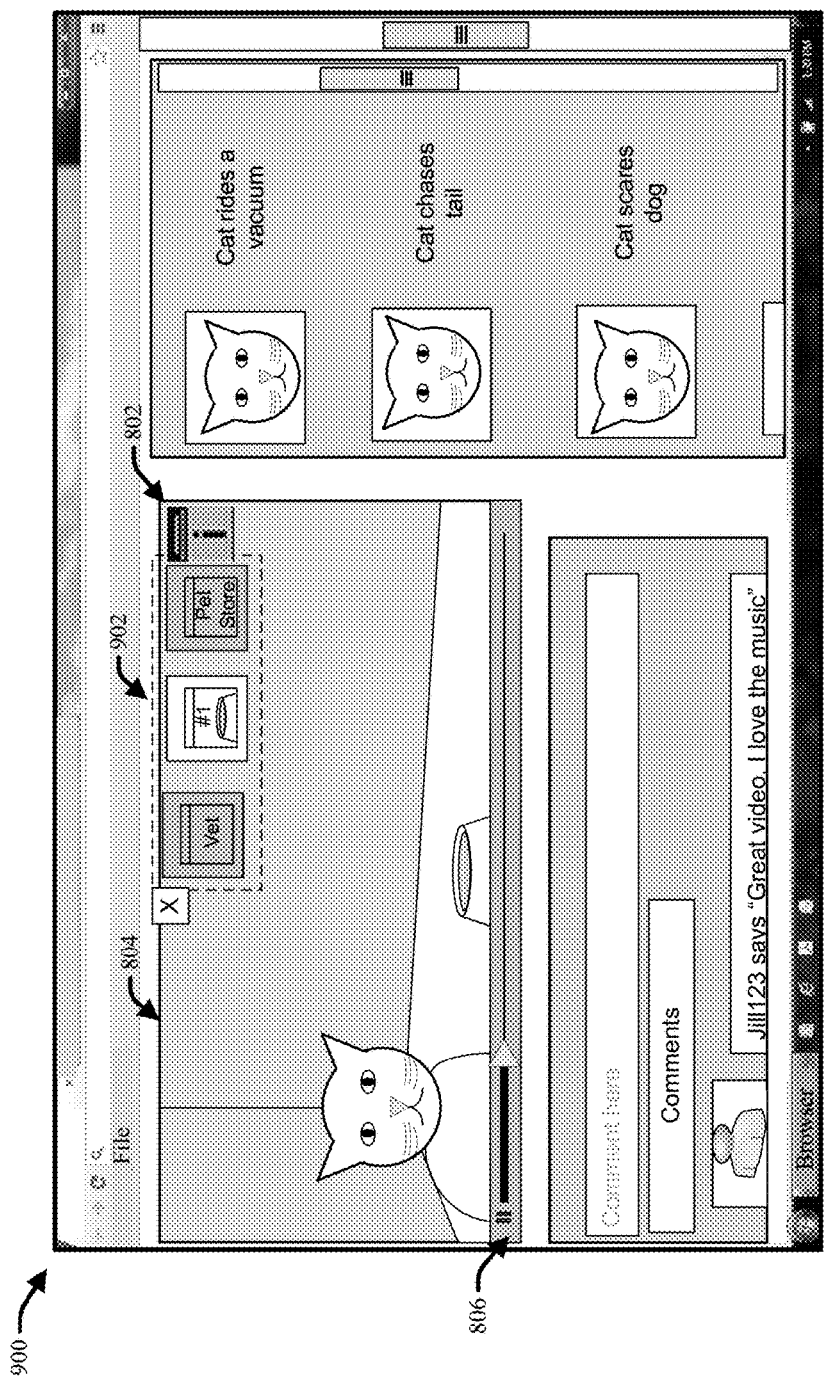
FIG. 9 presents another example user interface that facilitates rendering information cards during playback of a video in accordance with various aspects and embodiments described herein.

FIG. 9 presents another example graphical user interface 900 provided by streaming media provider 102 that is displayed at client device 112 in accordance with various aspects and embodiments described herein. Interface 900 includes similar elements as interface 800. Repetitive description of like elements employed in respective embodiments described herein is omitted for sake of brevity.

Interface 900 includes an information card gallery 902 of reduced sized or condensed representations of information cards included in a flyout stemming from information icon 802. Selection of a condensed information card included in the flyout can result in the generation of a full sized version of the information card. In an aspect, interface 900 can be generated/rendered by client interface component 114 and/or server interface component 110 in response to a triggering event, including but not limited to: selection of the information icon 802, occurrence of a specific time point or time frame during playback, and the like. In an aspect, the condensed representations of the information cards include a thumbnail image associated with the content of the information card, respectively. In other aspects, the condensed representations of the information cards can include, text, hyperlinks, icons, or other types of data. In various aspects, client interface component 114 and/or server interface component 110 can close or hide information card gallery 902 in response to user input electing to close the gallery or the passage of a predetermined amount of time.

Figure 10:
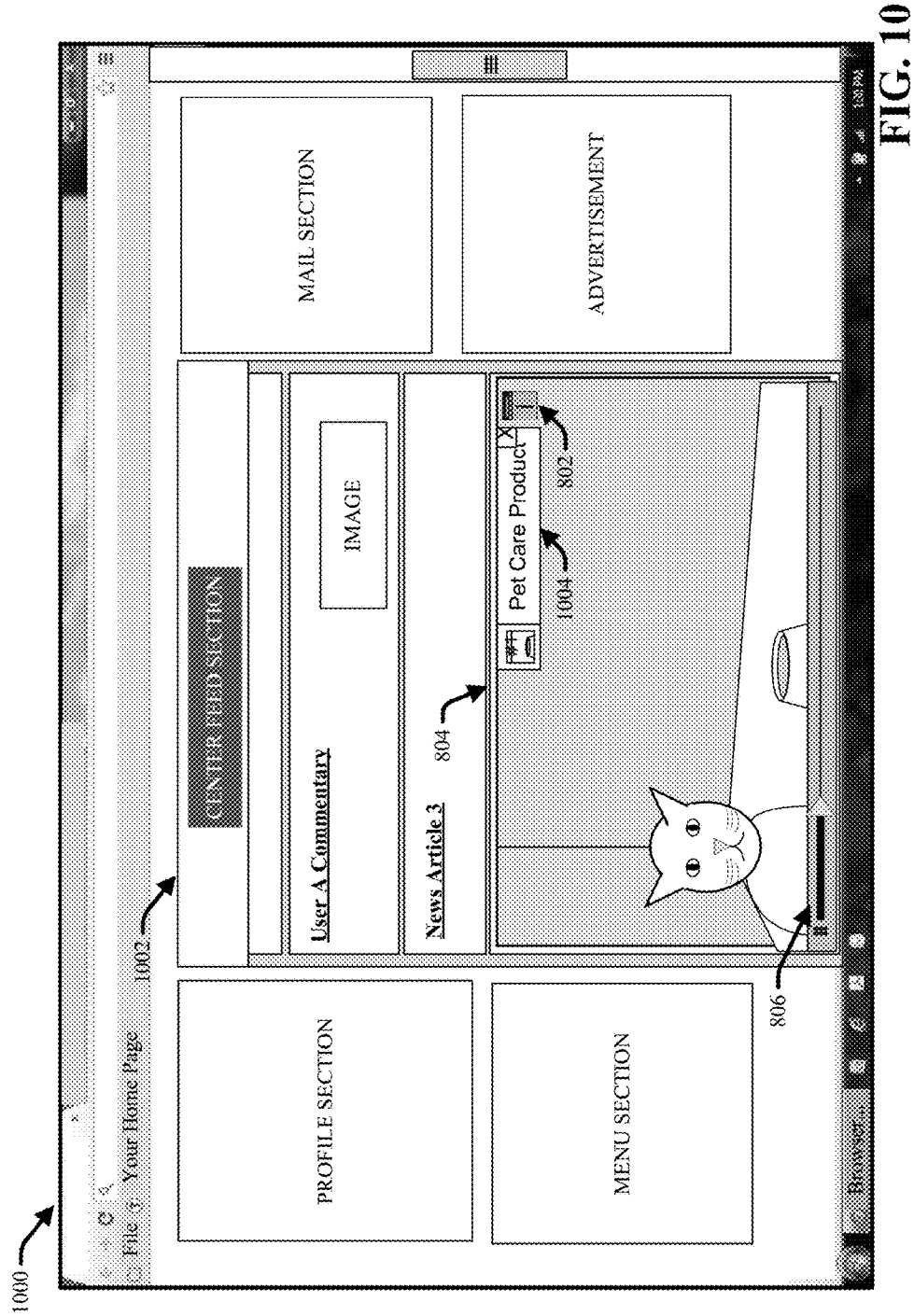
FIG. 10 presents another example user interface that facilitates rendering information cards during playback of a video in accordance with various aspects and embodiments described herein.

FIG. 10 presents another example graphical user interface 1000 provided that is displayed at client device 112 in accordance with various aspects and embodiments described herein. Interface 1000 includes similar elements as interfaces 800 and 900. Repetitive description of like elements employed in respective embodiments described herein is omitted for sake of brevity.

Interface 1000 provides an example user profile page of a social networking website remote from streaming media provider 102. The profile page includes various menus and sections, including a center feed section 1002 with various feed items. One of the feed items is an embedded version of media player 804. The embedded media player 804 is currently playing the cat video, wherein the cat video is hosted/provided by the streaming media provider 102. For example, embedded media player 804 can be embedded at the social networking profile page using embed code, generated by streaming media provider 102, that contains a player identifier associated with the specific media player and the specific video identifier for the cat video with a reference URL at the streaming media provider 102. The embed code, when executed, can cause the embedded media item player to be displayed on the user profile web page when selected as a destination for the embedded video. In an aspect, media player 804 can provide controls or functionality to display information cards, even when is embedded in a website or other entity (e.g., email, etc.).

Traditional media item players do not have built in control of metadata displays, such as information cards. Further, other media item players may not be capable of selecting metadata for information cards as described herein. Various embodiments disclosed herein can allow for an enhanced user experience, increased visibility of metadata, and a more efficient media item sharing system.

In an embodiment, in association with playback of the cat video in the embedded media player 804, information icon 802 is rendered with a representation 1006 of an information card stemming from the information icon 802. The representation 1006 can include a predetermined number of fields or amount of information, such as an image field and a title field. Selection of the representation 1006 of the information can result in the rendering of a full sized version of the information card. In an aspect, the representation 1006 of the media card functions as a teaser and indicates the association of the media card with the current time frame of the video. The representation 1006 may be configured to disappear after a preset duration of time.

Figure 11:
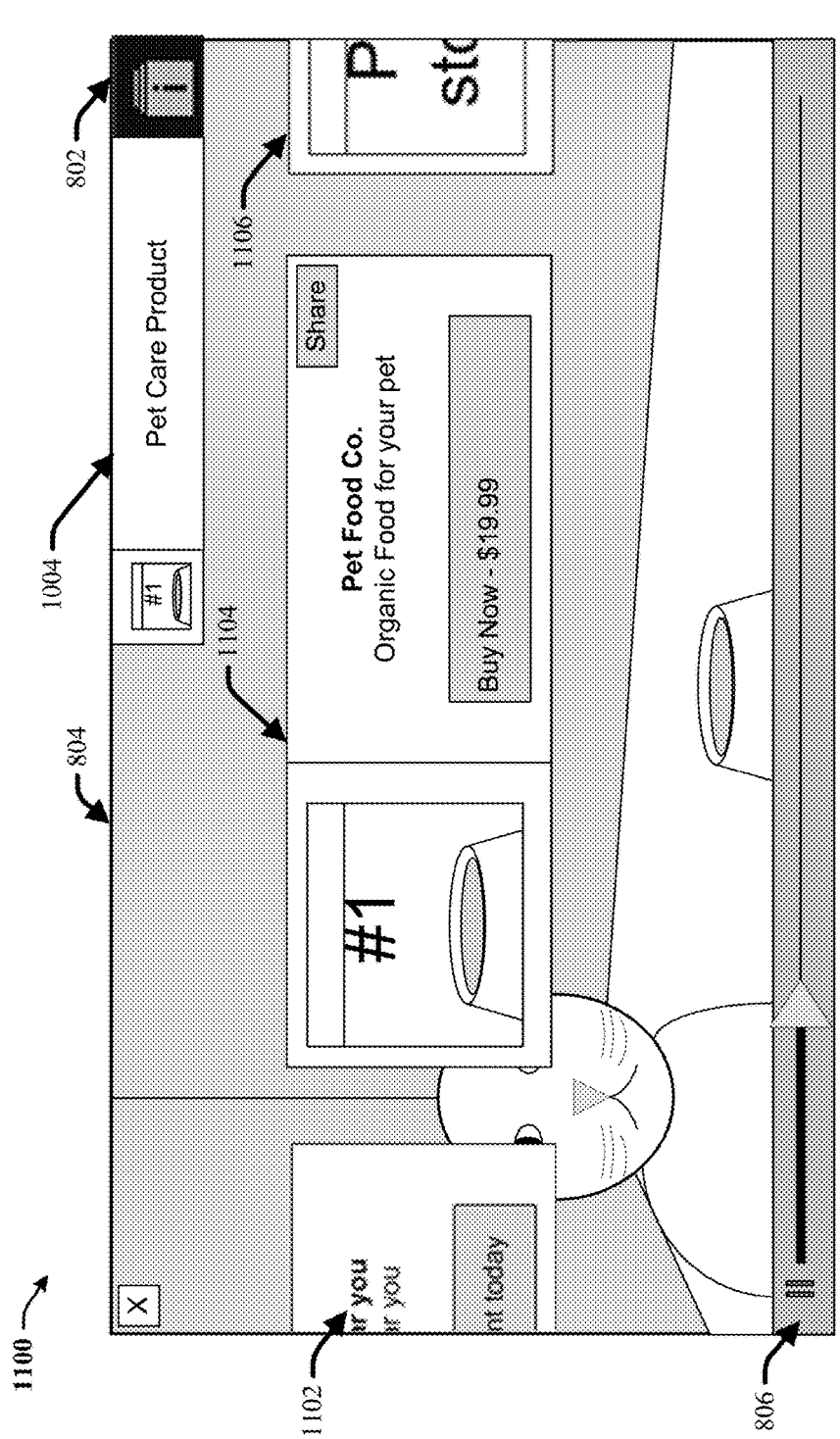

FIG. 11 presents another example graphical user interface 1100 provided by streaming media provider 102 that is displayed at client device 112 in accordance with various aspects and embodiments described herein. Interface 1100 includes similar elements as interfaces 800, 900 and 1000. Repetitive description of like elements employed in respective embodiments described herein is omitted for sake of brevity.

Interface 1100 depicts a full screen version of media player 804 including information icon 802 and the condensed representation 1004 of information card #1 extending therefrom. An enlarged or full version 1104 of the information card is further displayed in the middle of the media player 804. In an aspect, the enlarged or full version 1104 of the information card is displayed in the middle of the media player as an overlay in response to selection of the condensed representation 1004 of the information card. The selected information card #1 can include various elements and information. For example, information card #1 includes an image, a title (depicted as Pet Food Co.), a description (depicted as "Organic Food for your pet"), and an action button (depicted as "Buy Now —$19.99). Selection of the action button can facilitate an action, such as directing a user to a website where a user can purchase a product or service.

It is noted that an action button can be utilized to facilitate various actions. For example, the action button can facilitate navigation to a disparate website (e.g., a purchasing page, etc.), selection of a different media item for playback, purchasing of a mobile application, adding an item to a playlist, bookmarking content associated with a information card, generating a social annotation associated with a information card, or the like.

In an aspect, information cards 1102 and 1106 can represent other information cards associated with the cat video. As depicted, portions of these additional information cards are revealed. In an aspect, the other available information cards 1102 and 1104 can be rendered in an order relative to selected information card 1106. For instance, the order can be based on respective time periods associated with the information cards. The user can provide input to cycle through or select different information cards to display in a focused position (e.g., the position of selected information card #1). For example, the input can include a swipe, a mouse click, an arrow key, or the like.

Figure 12:
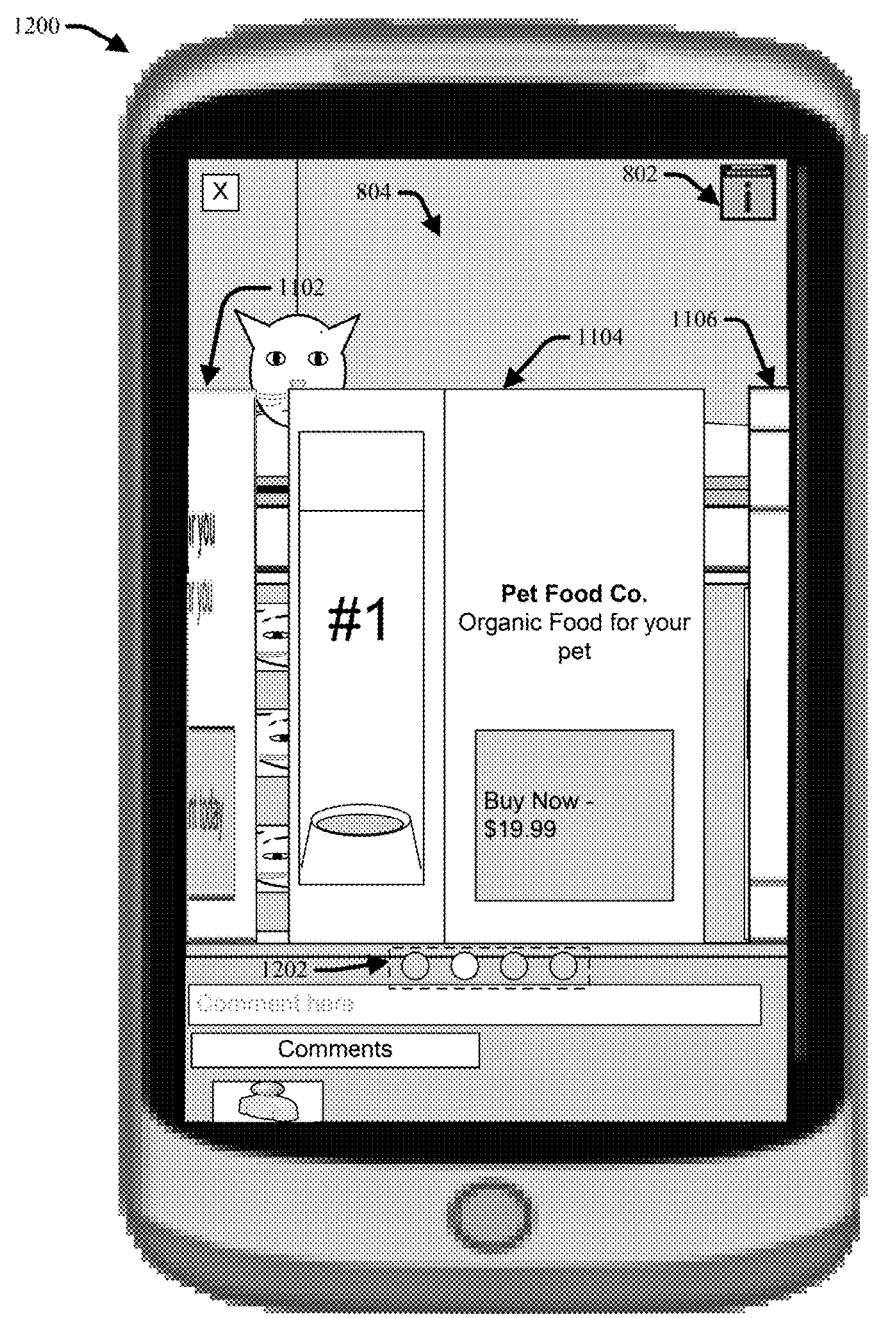
FIG. 12 presents another example user interface that facilitates rendering information cards during playback of a video in accordance with various aspects and embodiments described herein.

FIG. 12 presents another example graphical user interface 1200 provided by streaming media provider 102 that is displayed at client device 112 in accordance with various aspects and embodiments described herein. Interface 1200 includes similar elements as interfaces 800, 900, 1000 and 1100. Repetitive description of like elements employed in respective embodiments described herein is omitted for sake of brevity.

Interface 1200 is an alternate version of interface 1100 when the media player 804 is rendered at a client device that is a smartphone or table held in a portrait or vertical position. In addition to the elements previously described, interface 1200 includes an information card selection control 1202 that facilitates navigation between information cards. As depicted, the information card selection control 1202 can include a series of buttons (e.g., the circles) that respectively correspond to an information card. Selection of the button for an information card can bring the information card to the centered position of the display area. The button for the selected information card is distinguished.

Figure 13:
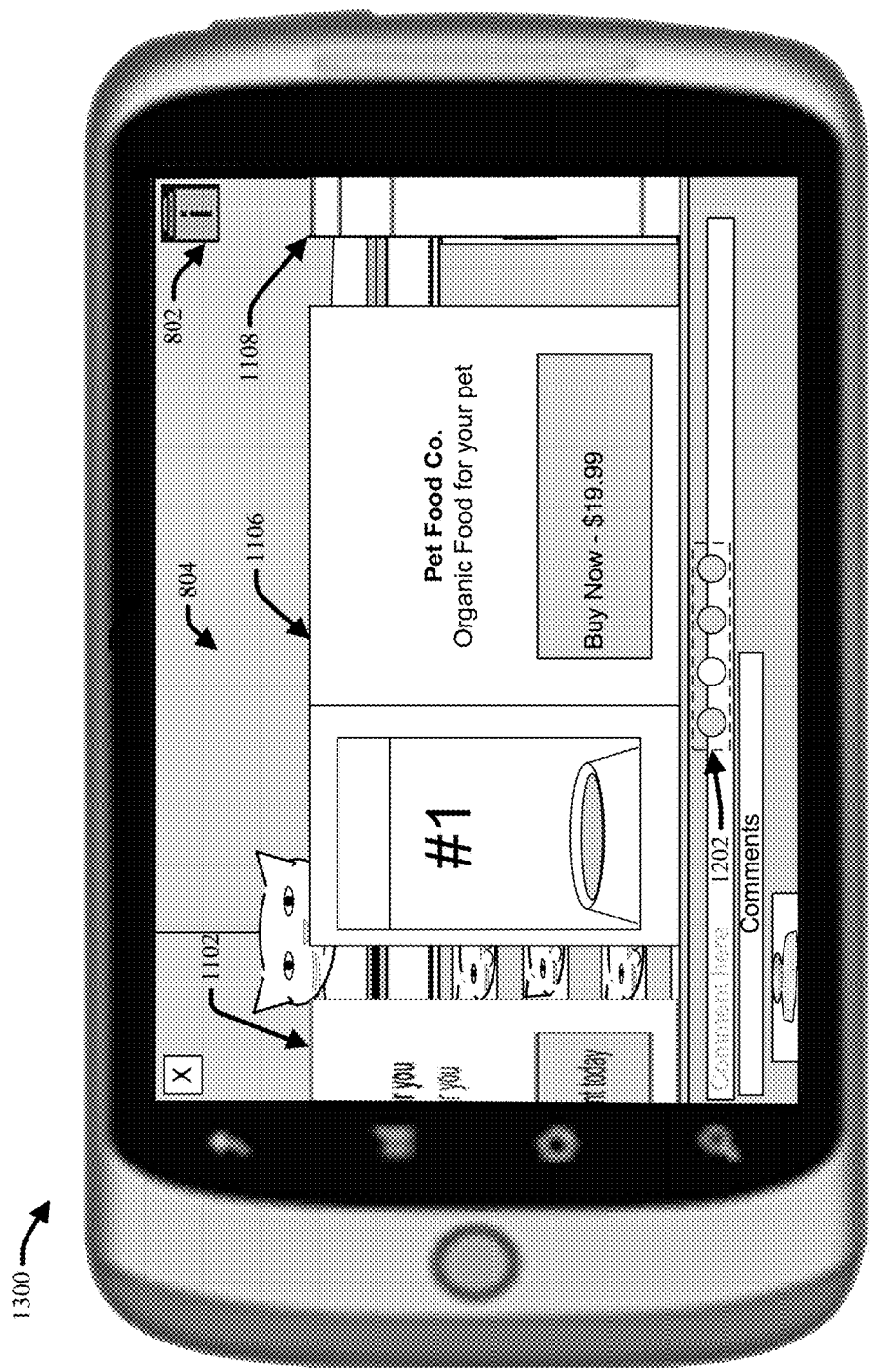
FIG. 13 presents another example user interface that facilitates rendering information cards during playback of a video in accordance with various aspects and embodiments described herein.

FIG. 13 presents another example graphical user interface 1300 provided by streaming media provider 102 that is displayed at client device 112 in accordance with various aspects and embodiments described herein. Interface 1300 includes similar elements as interfaces 800, 900, 1000, 1100, 1200. In particular, interface 1300 is an alternate version of interface 1100 or 1200 when the media player 804 is rendered at a client device that is a smartphone or table held in a horizontal or landscape position. Repetitive description of like elements employed in respective embodiments described herein is omitted for sake of brevity.

Figure 14:
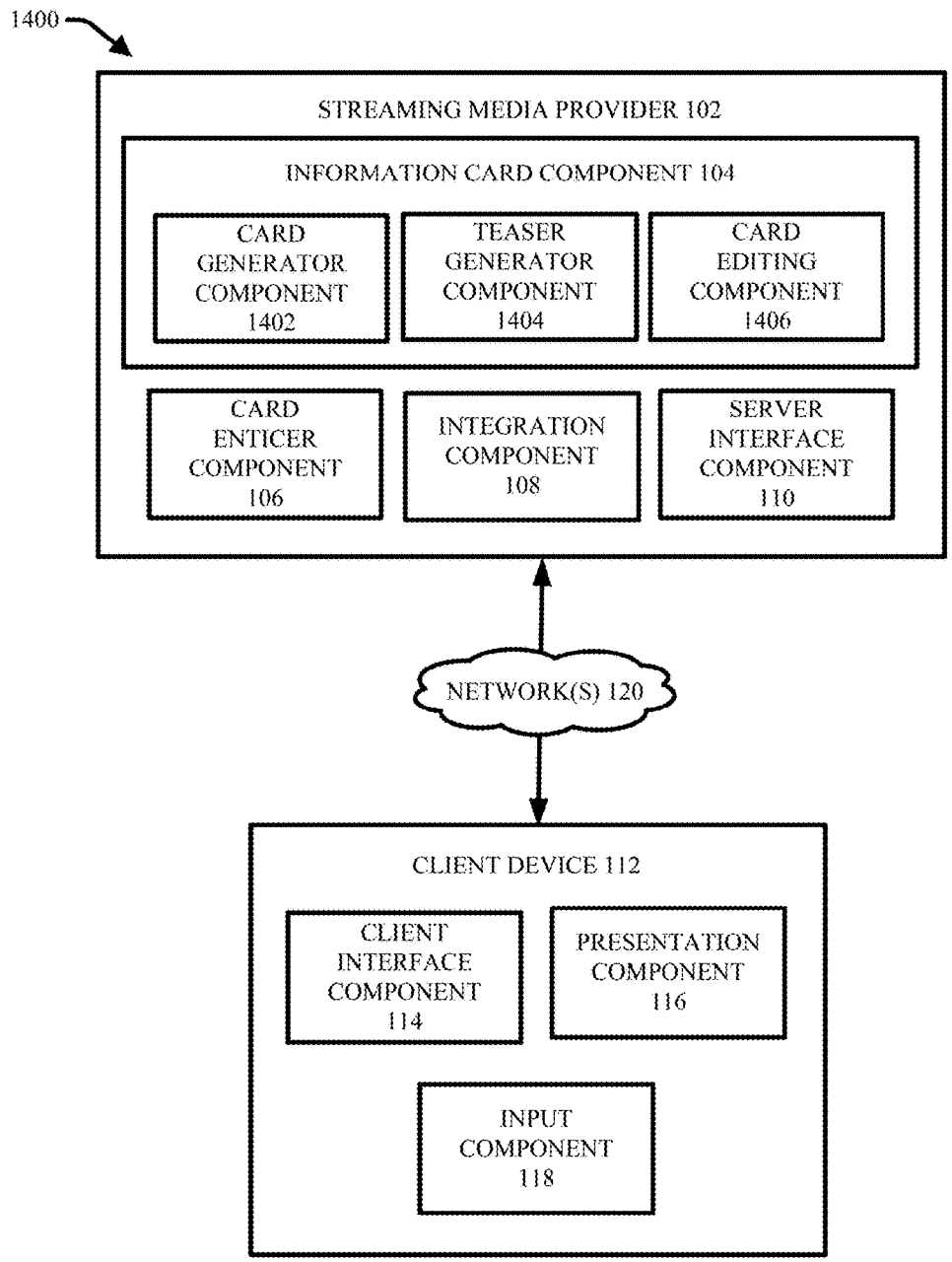
FIG. 14 illustrates another example system for generating information cards for a video and rendering the information cards during playback of the video in accordance with various aspects and embodiments described herein.

Turning now to FIG. 14, presented is another example system 1400 for generating information cards for a video and rendering the information cards during playback of the video, in accordance with aspects and embodiments described herein. System 1400 includes same or similar features and functionalities as system 100 with the addition of card generator component 1402, teaser generator component 1404, and card editing component 1406. Repetitive description of like elements employed in respective embodiments described herein is omitted for sake of brevity.

System 1400 facilitates user creation of information cards and/or association of the information cards with a video. For example, they system can allow a creator of a video (or an owner of the video, or entity otherwise having ownership/editing authority of the video) to choose one or more preformed information cards to associate with the video. In another example, the system can allow the creator of the video to design/create information cards for the video. The system can further generate the information cards and associate the information cards with the video based on guided user input such that the information cards provided by the system are consistently formatted and rendered across various platforms.

Card generator component 1402 is configured to receive user input identifying or providing content for inclusion in an information card and generate the information card based on the user input. Similarly, teaser generator component 1404 is configured to receive user input identifying or providing content for inclusion in a teaser and generate the teaser based on the user input. Card generator component 1402 can also allow a user to select a time point or time frame to associate an information card with a video. For example, the user can select a time at which a teaser for the information card will be displayed during playing of the video. As previously described, when the teaser is displayed, the user can select the teaser to reveal the associated information card. In some aspects, teaser generator component 1404 can allow a user to select a duration of time for displaying of the teaser during playing of the video. In other aspects, information card component 104 can set or control the duration of time for displaying of the teaser (e.g., five seconds). Card editing component 1406 can allow a user to access an information card and/or teaser that has been previously associated with a video and edit the information card and/or the timing of integration of the information card.

In an embodiment, the streaming media provider 102 an provide a card creation graphical user interface that includes a menu with different information card types to choose from (e.g., a merchandise card, a fundraising card, a video or playlist card, an associated website card, a fan funding card, a poll card, etc.), wherein each type of card provides a different purpose and represents a different type of content. Each card type can be associated with a card creation form with different input fields that guide the user with selection of content to include in the card. The input fields can vary depending on the card type. Example form fields can include but are not limited to: a title field, a call to action text field, a teaser text field, a product identifier field, an add hyperlink filed, an add image filed, an add video field, or an add poll/survey field. Using the guided form fields, the user can provide the required input and the system can generate the corresponding card with a preconfigured format. In addition, the card creation interface can allow the user to associate the card with a specific time point or time frame in the video.

Figure 15:
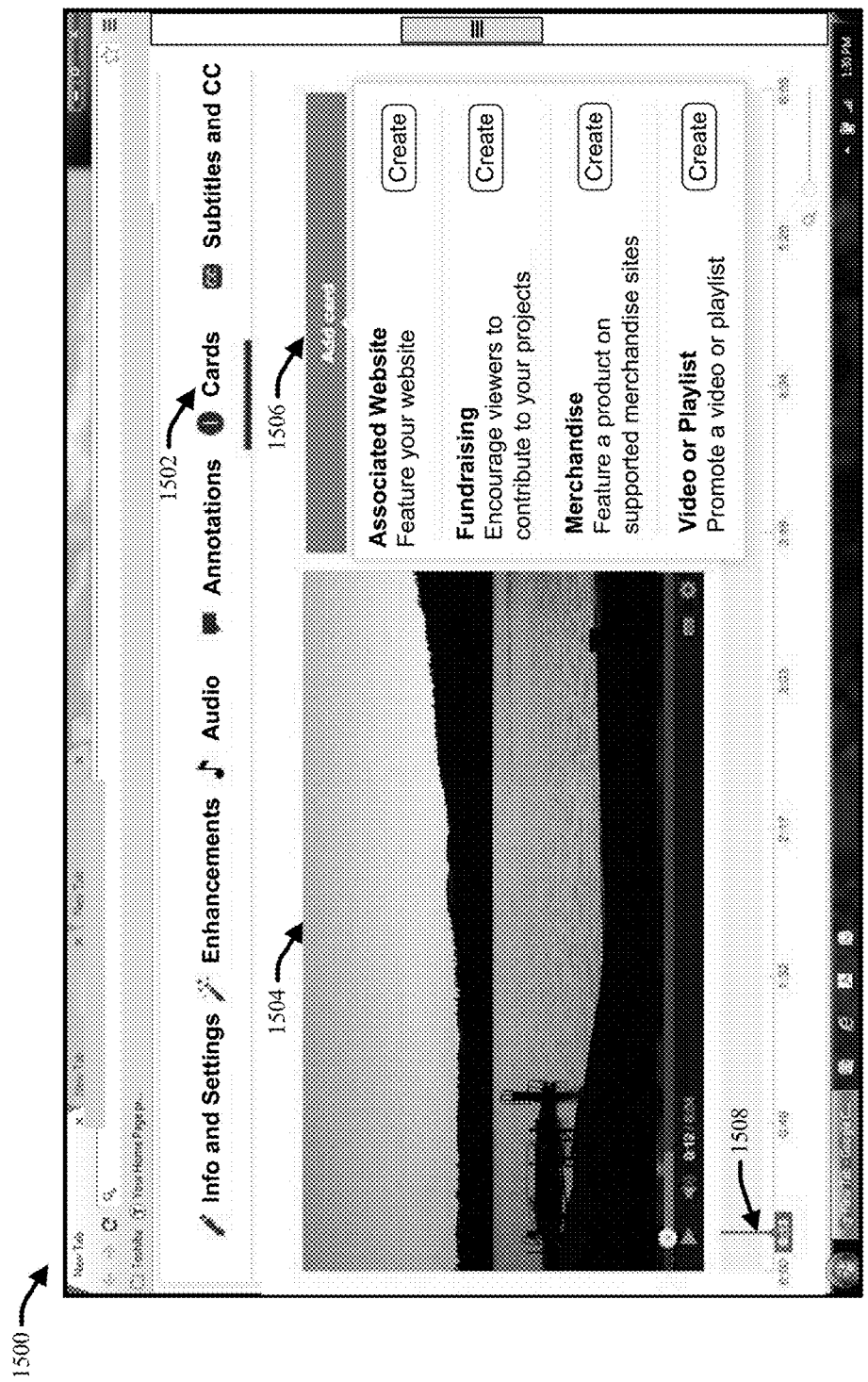
FIG. 15 presents an example user interface that facilitates generating information cards for a video in accordance with various aspects and embodiments described herein.

For example, FIG. 15 provides an example card creation graphical user interface 1500 that facilitates generating information cards for a video and associating the information cards with the video in accordance with various aspects and embodiments described herein. In an aspect, interface 1500 is generated/configured by streaming media provider 102 and displayed at client device 112 via presentation component.

Interface 1500 includes a media player 1504 with a video displayed therein. In an aspect, the video was uploaded to streaming media provider 102 by the creator of the video for publication by the streaming media provider via its network accessible platform (e.g., its website or thin client application). Interface 1500 further includes a top menu bar with various menu options related to editing the video and/or controlling the publication of the video by the streaming media provider. For example, these menu options include "info and settings," "enhancements," "audio," "annotations," "cards," and "subtitles and CC." The card menu option 1502 is selected, as indicated by the underlining of the card menu option 1502.

In an aspect, in response to selection of the card menu option 1502, an "add card" dialogue box 1506 is displayed adjacent to the media player 1504. The add card dialogue box 1506 includes a list of different information cards types from which the use can chose to add to the video. This include an associated website card, a fundraising card, a merchandise card, and a video or playlist card. Each of the respective cards options are associated with a create button. Selection of the create button can result in the generation of card creation form that facilitates guided user input in association with selecting content to include in the respective cards. The card creation input forms can vary depending on the selected card type.

Interface 1500 further includes a timeline toolbar below the media player 1504 with an adjustable time marker 1508. In an aspect, the user can slide the time marker 1508 to a desired time point or video frame on the timeline toolbar where the user would like to associate a selected information card. In some aspects, as the user slides the time marker 1508 along the timeline toolbar, the video frame occurring at the time point where the time marker is located is displayed in the media player (e.g., as a still image). After the information card is created, it can be integrated with the video at the desired time point or video frame. For example, a teaser for the video can be configured to be rendered at the selected time point/frame during playback of the video.

Figure 16:
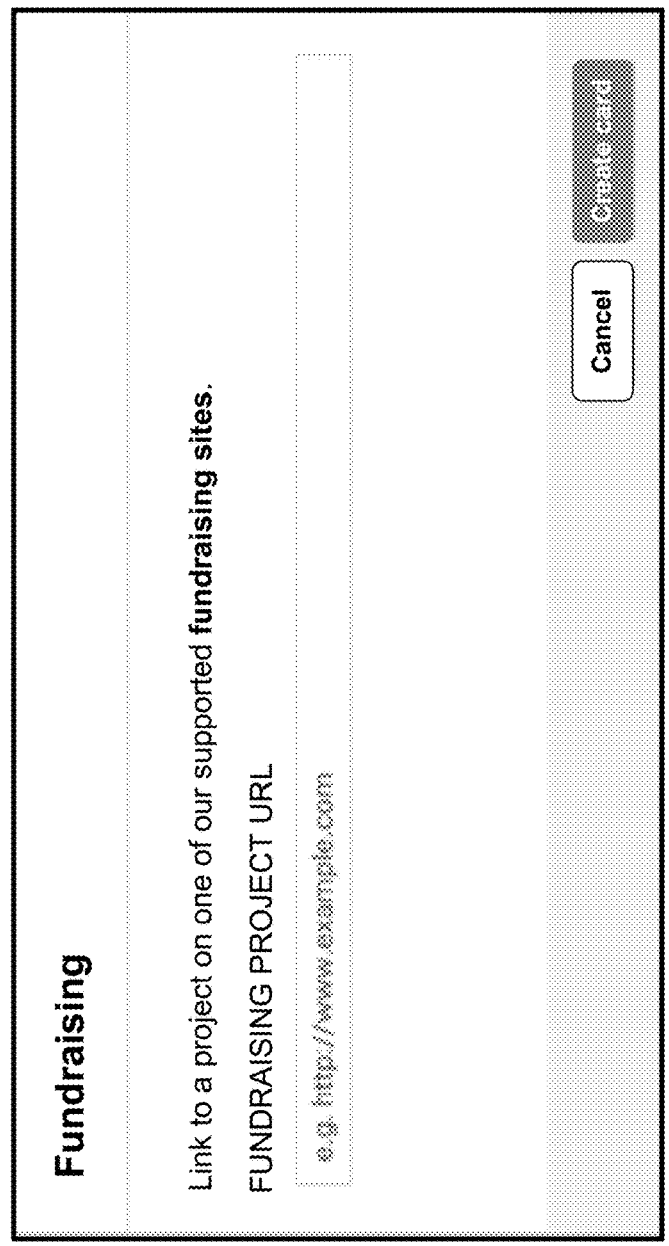
FIG. 16 presents an example user interface that facilitates generating information cards for a video in accordance with various aspects and embodiments described herein.
Figure 17:
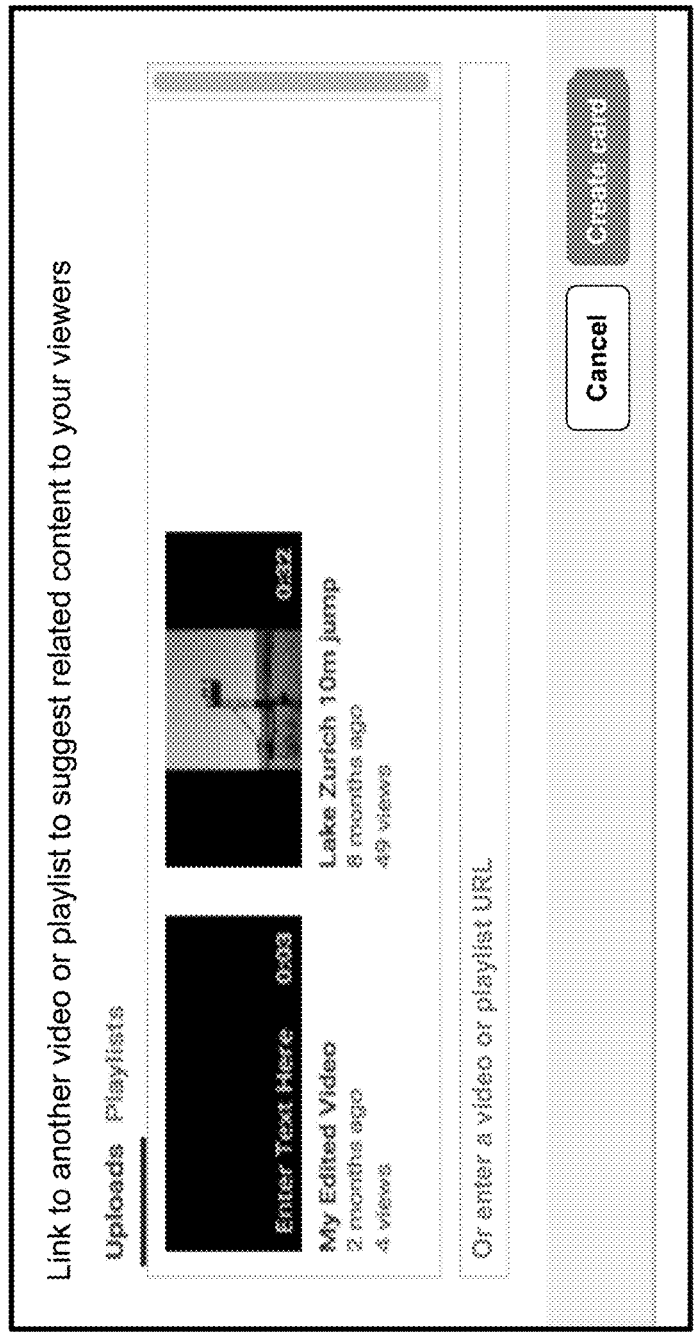
FIG. 17 presents an example user interface that facilitates generating information cards for a video in accordance with various aspects and embodiments described herein.
Figure 18:
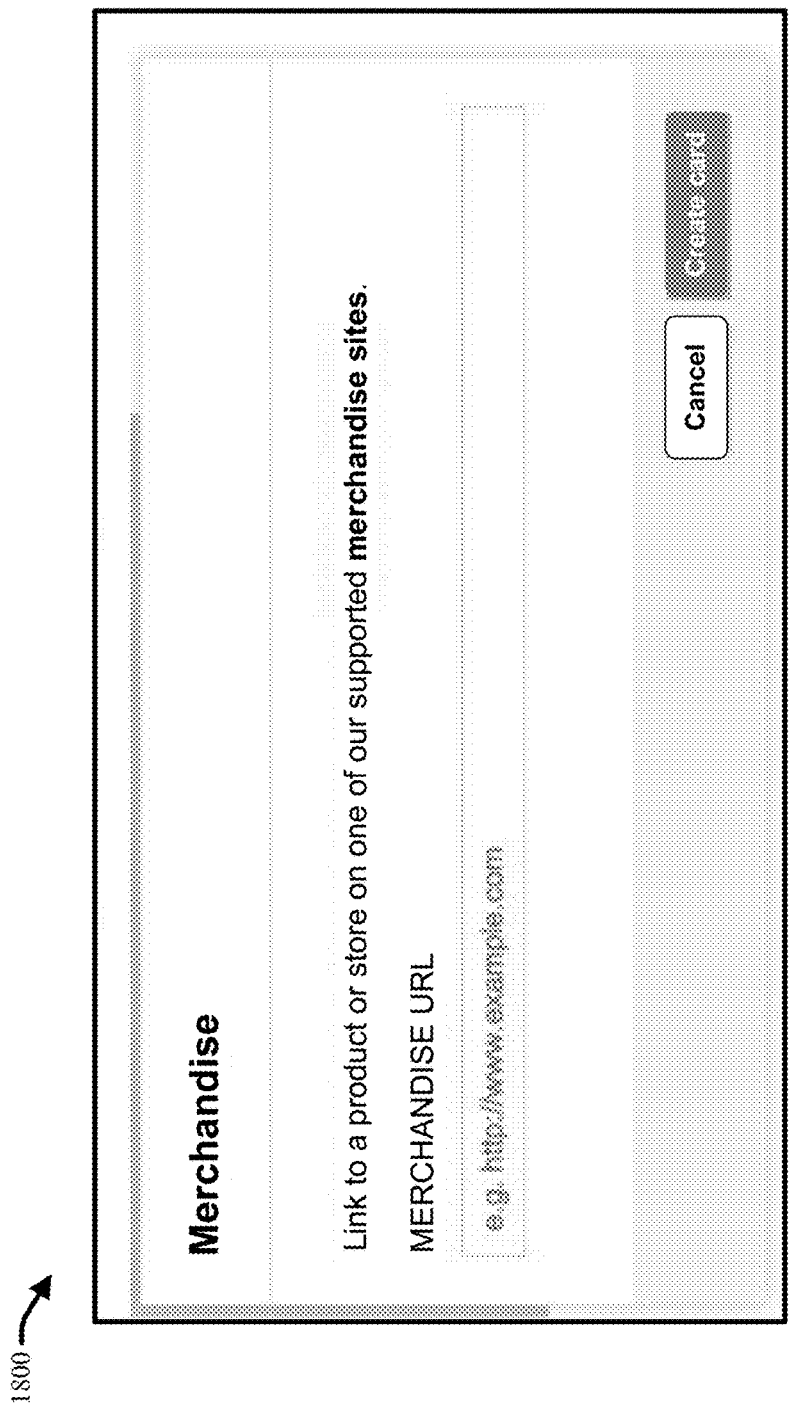
FIG. 18 presents an example user interface that facilitates generating information cards for a video in accordance with various aspects and embodiments described herein.

FIGS. 16-18 provides example dialogue boxes including card creation forms 1600, 1700, and 1800 generated in response to selection of the creation button for various information cards from the add card dialogue box 1506 of interface 1500. It is to be appreciated that these dialogue boxes can be presented by presentation component 116 in a graphical user interface generated at the client device 112. FIG. 16 presents an example fundraising card creation form 1600, FIG. 17 presents an example add video or playlist card creation form 1700, and FIG. 18 presents an example merchandise card creation form 1800.

Each or the respective forms 1600, 1700 and 1800 include an input field that allows the user to enter a URL for a specific item represented by the card, (e.g., a URL for a fundraising website, a URL for a video or playlist, and a URL for a merchant). In an aspect, after the user enters a suitable URL and selects the create card button on the form, the card generator component 1402 generates the corresponding card, populating the card with information based on the selected URL. For example, the card generator component 1402 can select a thumbnail image for the card, and include stock text for the card based on the URL and/or the selected card type. The card generator component 1402 can format the appearance of the card according to a predefined layout. In another embodiment, streaming media provider 102 can provide a more detailed card creation form that facilitates guided user input of additional information for inclusion in the card.

Figure 19:
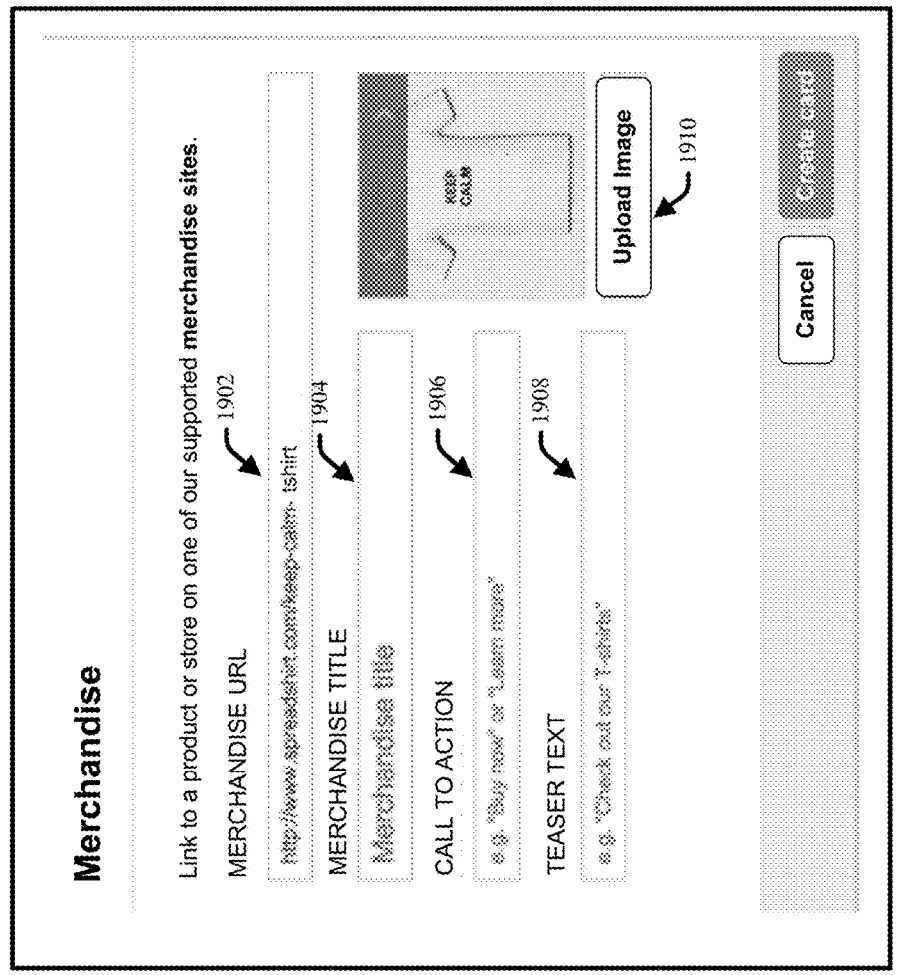
FIG. 19 presents an example user interface that facilitates generating information cards for a video in accordance with various aspects and embodiments described herein.

For example, FIG. 19 presents another card creation form 1900 that facilitates entering information for inclusion in a merchandise information card. In an aspect, card creation form 1900 is generated in response to selection of the create card button on form 1800. In another aspect, card creation form 1900 is generated in response to selection of the create button associated with the merchandise card option in dialogue box 1506 of interface 1500.

Card creation form 1900 includes a set of defined input fields, including a URL field 1902 that allows the user to add a merchandise URL, a title field 1904 that allows the user to enter a title for the merchandise, a call to action field 1906 that allows the user to add call to action text, and an upload image field 1910 that allows the user to upload an image for the card. Card creation form 1900 also include a teaser input field 1908 wherein a user can enter text to be presented in the form of a teaser for the card. In some aspect, the user can also select an image or animation to include in the teaser. The teaser generator component 1404 can further generate the teaser based on the input provided via the teaser input field.

Figure 20:
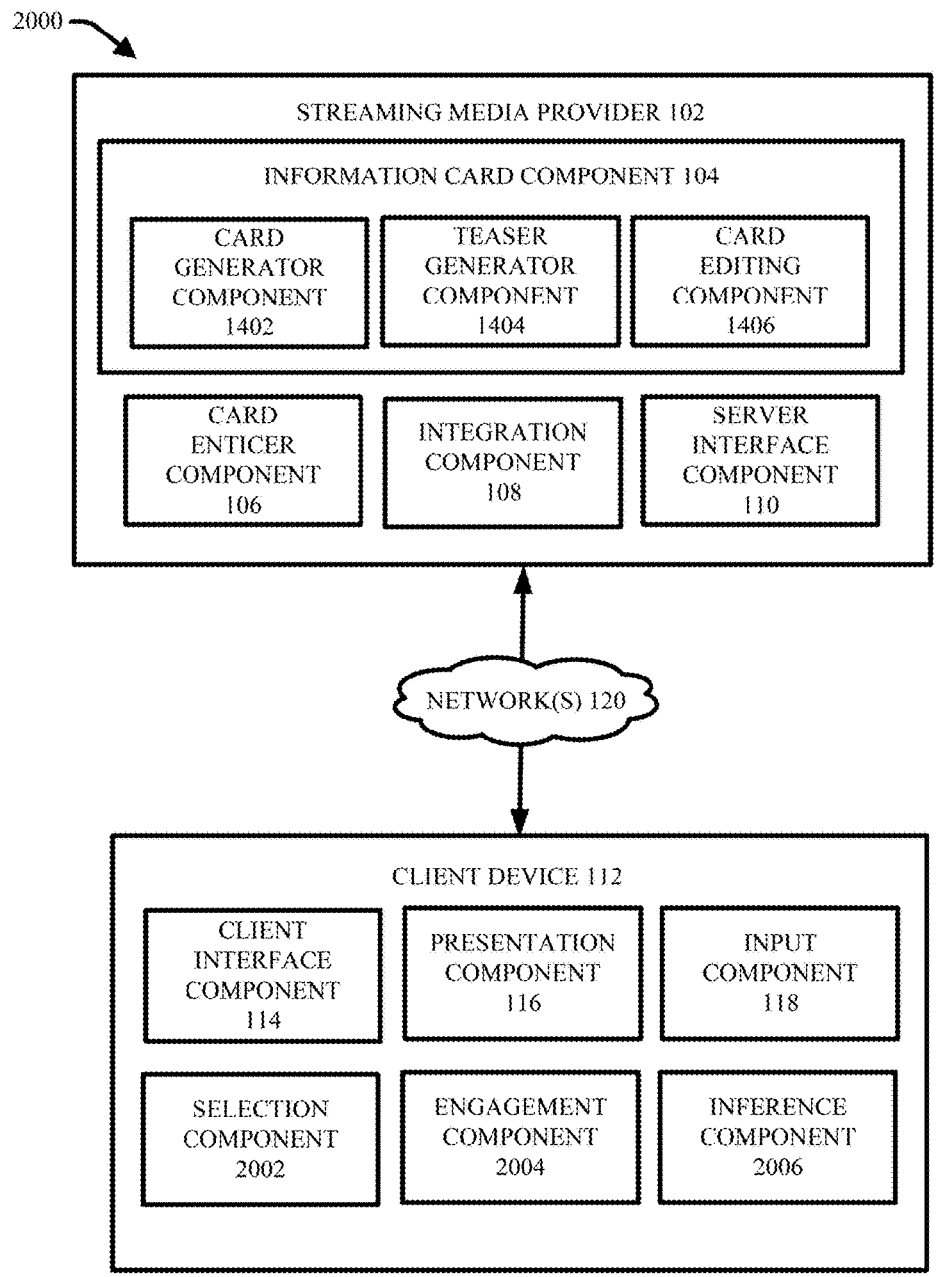
FIG. 20 illustrates another example system for generating information cards for a video and rendering the information cards during playback of the video in accordance with various aspects and embodiments described herein.

Referring now to FIG. 20, presented is another example system 2000 for generating information cards for a video and rendering the information cards during playback of the video, in accordance with aspects and embodiments described herein. System 2000 includes same or similar features and functionalities as system 1400 with the additions of selection component 2002, engagement component 2004 and inference component 2006 to client device. Although these components are included at client device in system 2000, one or more of the selection component 2002, the engagement component 2004 or the inference component 2006 can also or alternatively be included at streaming media provider 102. Repetitive description of like elements employed in respective embodiments described herein is omitted for sake of brevity.

System 2000 is configured to automatically (e.g., without user input), determine or infer what information cards to associate with a video and when to reveal a teaser for the information cards during playback of the video, prior to video playback or during video playback (e.g., in real-time), based on various factors, including but not limited to: the content of the video, the duration of the video, user preferences, user demographics, user social affiliations, user behavior regarding past usage of streaming media provider 102 by the user watching the video and/or other users of the streaming media provider, user context, device type, and user engagement (e.g., during playback).

For instance, in some aspects, a plurality of pre-existing information cards can be accessible to streaming media provider (e.g., stored in memory associated with streaming media provider 102). These pre-existing information card can include information cards created by users and authorized for use by system 2000 in association with integration with videos provided by the streaming media provider. For example, a user can create a plurality of information card for his or her video. When the video is selected for playing by another user, the selection component 2002 can then select a subset of the information cards for associating with the video based on various factors tailored to the other user (e.g., user preferences, user demographics, user social affiliations, user behavior, user context, device type, and user engagement). In another aspect, a user can create information cards for his or her video and authorize system 2000 to use them on other videos provided by streaming media provider 102. For example, a user can create a video or playlist card for association with his or her video. The user can also allow system 2000 to use this card for association with other video provided by the streaming media provider 102.

These pre-existing information cards can also include information cards automatically created by information card component as discussed supra (e.g., based on content of a video, based on metadata associated with a video, etc.). For example, information card component 104 can be configured to automatically generate information cards for the streaming media provider for association with videos provided by the streaming media provider, such as information cards promoting videos, playlists, or channels provided by the streaming media provider 102. In another example, information card component 104 can automatically create information cards that promote other websites or products sponsored by the streaming media provider 102.

In an embodiment, selection component 2002 can select one or more pre-existing information cards to associate with a video based on content of the video. For example, selection component 2002 can select an information card to associate with a video based on a correlation or similarity between the content of the information card and the content of the video. For instance, selection component 2002 can select a fundraising information card that supports an animal rescue organization for association with a video about animals. In another example, selection component 2002 can select a playlist information card with music videos from a particular artist for association with another video from the particular artist.

Selection component 2002 can also select one or more pre-existing information cards to associated with a video based on a duration of the video. For example, selection component 2002 can determine the number of information cards to associate with a video based on the duration of the video, wherein the longer the video, the more information cards for association therewith.

Selection component 2002 can further select one or more pre-existing information cards to associate with a video based on various personalized factors related to the user viewing the video, such as preferences of the user, demographics of the user, social affiliations of the user. For example, selection component 2002 can select information cards to associate with a video that the user will likely select or view based on the information cards having content that the user tends to prefer, that other users similar to the user in demographics tend to prefer, or that the user's friends tend to prefer. Selection component 2002 can also consider past usage behavior of the user of the streaming media provider 102. For example, past usage can include watch history of the user and media endorsed by the user as determined based on media the user is subscribed to, media the user likes, media the user shares, media the user comments on, etc.

Selection component 2002 can also select one or more information cards to associate with a video based on information regarding past information card interaction/selection by the user. For example, if the user tends to select information cards of a particular type (e.g., video or playlist information cards vs. merchandise information cards), the selection component 2002 can select information cards to associated with a video selected for watching by the user that are of the particular type.

Selection component 2002 can also select one or more information cards to association with a video selected for watching by a user based on a current context of the user. According to this aspect, context can include a current location of the user, a current time of day, and events, things, other users, activities of the user, etc., associated with the current location of the user and the current time of day. For example, if a user is located at the zoo and watching a video, selection component 2002 can select an information card that is a fundraising card for the zoo. In another example, if a user is watching a video at a shopping mall, selection component 2002 can select more merchandise information cards to associate with the video based on the assumption that the user is in a shopping frame of mind.

In addition to automatically selecting information cards to associate with a video, system 2000 can also determine or infer where to integrate an information card with a video.

For instance, integration component 108, server interface component 110 and/or client interface component 114 can determine or infer when to display a teaser for an information card for a video during playback of the video. In an aspect, the timing of display of the teaser and/or the particular information card for which to display a teaser is based on monitored user engagement levels during playback of the video. For example, integration component 108 can be configured to flash a teaser for an information card at a point during playback of the video when the viewer's engagement with the video falls below a threshold level of user engagement/interest.

In an embodiment, engagement component 2004 can monitor user engagement/interest with a video during playback to dynamically determine when the user's engagement falls below a threshold level of user engagement. The level of user engagement can be based on various factors, including but not limited to: user interaction with the video and/or the client device during playback (e.g., cursor movement, control of playback), size of the media player, visibility of the media player, sound level of the video (e.g., whether the video is on mute), and direction of view (e.g., whether the user is looking at the display screen).

In some aspects, integration component 108 can also consider previous determinations of drop of off points in a video based on watch histories of a plurality of users with respect to the video. For example, integration component 108 can receive information indicating points in the video where users tend to drop off and stop watching the video and/or lose interest/engagement with the video. Integration component 108 can further chose to integrate an information card at these drop off points.

Inference component 2006 is configured to provide for or aid in various inferences or determinations associated with aspects of systems and interfaces described herein. For example inference component 2006 can facilitate selection component 2002 in associating inferring what pre-existing information cards to associate with a video based on the various factors described above. In another example, inference component 2006 can facilitate integration component 108 in association with determining or inferring where to integrate an information card into a video and when to display a teaser for the information card during playback of the video.

In order to provide for or aid in the numerous inferences described herein, inference component 2006 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x4, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 21:
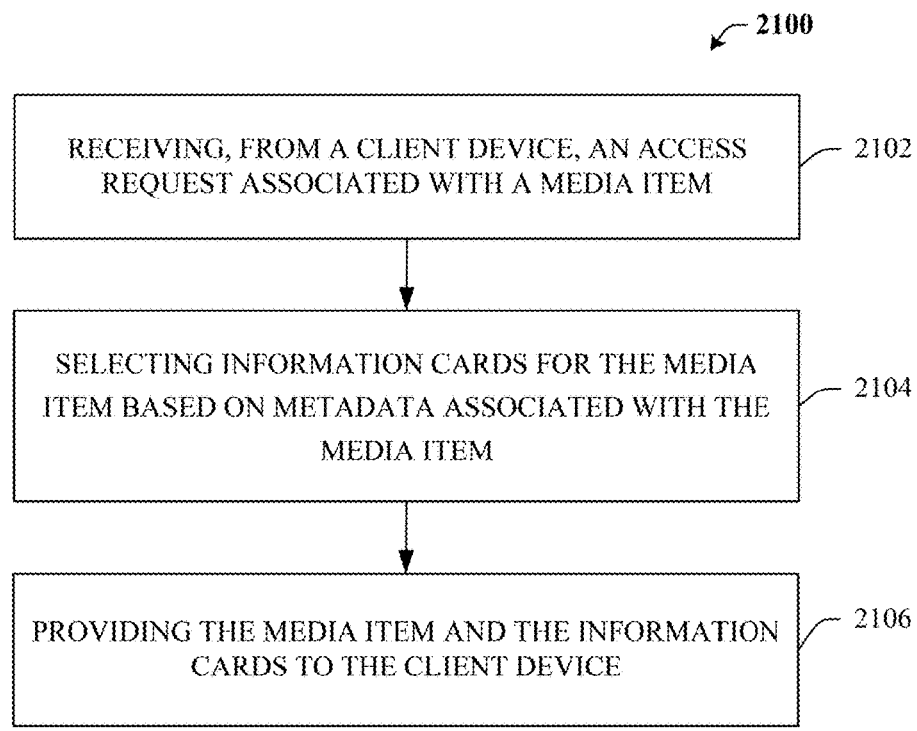
Figure 22:
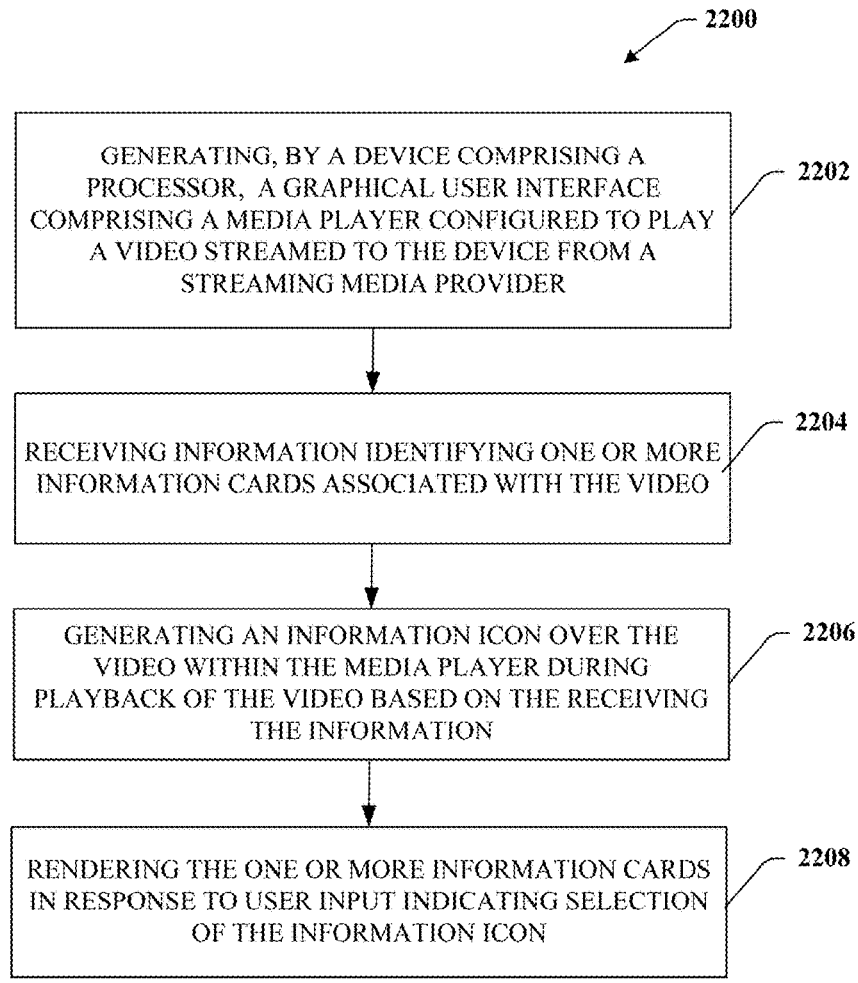
FIG. 22 presents another example method for generating information cards for a video and rendering the information cards during playback of the video in accordance with various aspects and embodiments described herein.
Figure 23:
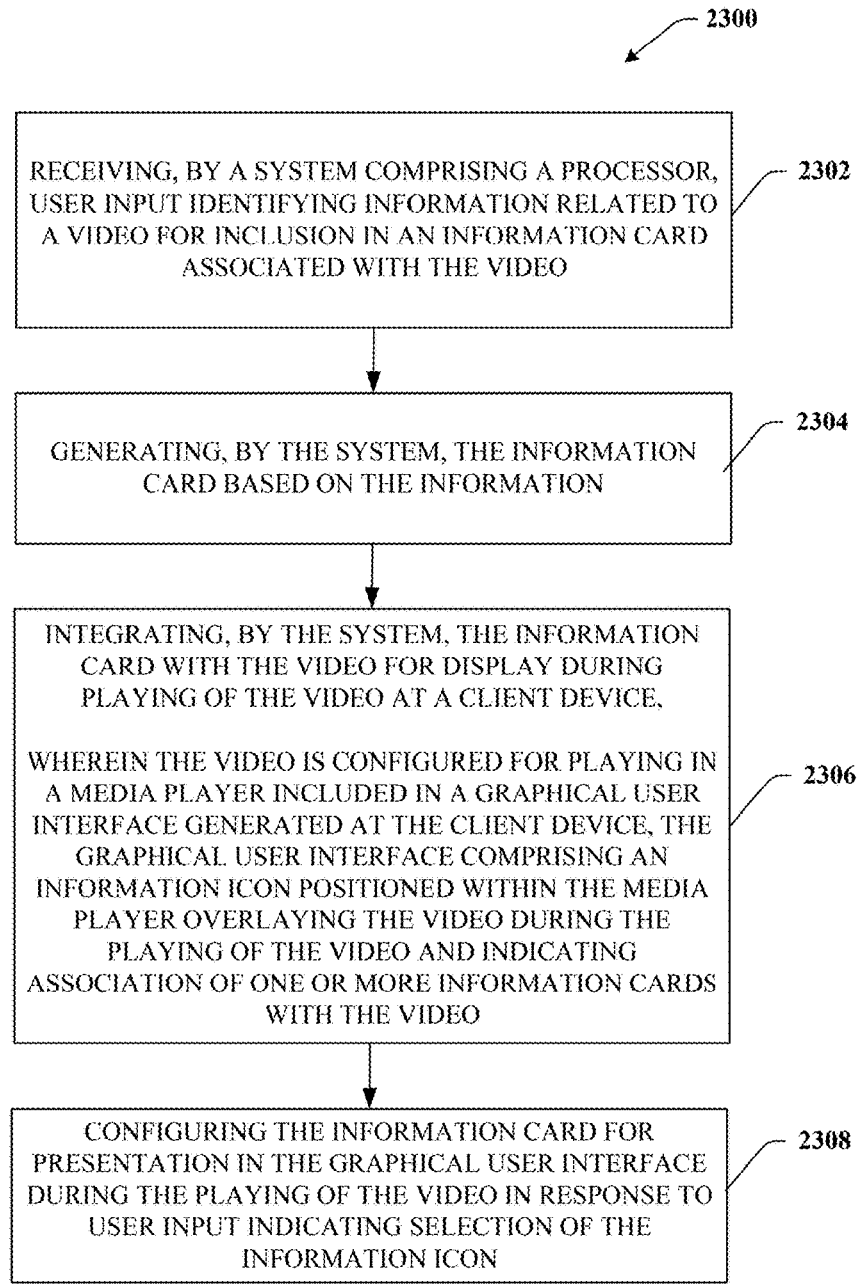
FIG. 23 presents an example method for generating information cards for a video and rendering the information cards during playback of the video in accordance with various aspects and embodiments described herein.

In view of the example systems and/or devices described herein, example methods that can be implemented in accordance with the disclosed subject matter can be further appreciated with reference to flowcharts in FIGS. 21-23. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 21 illustrates a flow chart of an example method 2100 for generating information cards for a video and rendering the information cards during playback of the video, in accordance with aspects and embodiments described herein. At 2102, a system can receive an access request associated with a media item. For example, a user can select a video for watching provided by streaming media provider via a website of the streaming media provider or using a thin client application supported by the streaming media provider 102 and provided on the user's client device. In another aspect, the user can initiate a request to play a video via an embedded media item player located remote from the streaming media provider 102 (e.g., at another website, in an electronic message, etc.). At 2104, the system can select (e.g., via selection component 2002) information cards for the media item based on metadata associated with the media item. In an aspect, the metadata can include identifiers that identify information cards that have been previously associated with the media item (e.g., via integration component 108). In another aspect, the metadata associated with media item can include information identifying content of the media item (e.g., tags), information identifying a creator of the media item, a artist of the media item, a title of the media item, etc. According to this aspect, selection component 2002 can select one or more information cards to associated with the media item that have content related to the content of the video.

At 2106, the system can provide the media item to the client device for playing. For example, the system can stream the media item/video to the client device. The system can also provide the client device with the information cards and/or information identifying when to render the information cards. In response to provision of the media item to the client device, the client device can play the media item and render the information cards (e.g., via presentation component 116) during playback of the media item in response to detecting a triggering event. For example, a triggering event can include occurrence of a specific frame or playback time in the video, selection of the information icon, selection of a teaser, or the like.

FIG. 22 illustrates a flow chart of another example method 2200 for generating information cards for a video and rendering the information cards during playback of the video, in accordance with aspects and embodiments described herein. At 2202, a system can receive an access request associated with a media item. At 2202, a client device generates a graphical user interface including a media player configured to play a video streamed to the device from a streaming media provider (e.g., via client interface component 114). At 2204, the client device receives information identifying one or more information cards associated with the video. At 2206, the client device further generates an information icon over the video (e.g., as an overlay) and within the media player during playback of the video based on the receiving the information. At 2208, the client device renders the one or more information cards in response to user input indicating selection of the information icon.

FIG. 23 illustrates a flow chart of another example method 2200 for generating information cards for a video and rendering the information cards during playback of the video, in accordance with aspects and embodiments described herein. At 2302, a system comprising a processor receives user input identifying information related to a video for inclusion in an information card associated with the video (e.g., via card generator component 1402). At 2304, the system generates the information card based on the information (e.g., via card generator component 1402). At 2306, the system integrates the information card with the video for display during playing of the video at a client device (e.g., via integration component 108). Wherein, the video is configured for playing in a media player included in a graphical user interface generated at the client device, the graphical user interface comprising an information icon positioned within the media player overlaying the video during the playing of the video and indicating association of one or more information cards with the video. The method further includes, at 2308, configuring the information card for presentation in the graphical user interface during the playing of the video in response to user input indicating selection of the information icon.

EXAMPLE OPERATING ENVIRONMENTS

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 24:
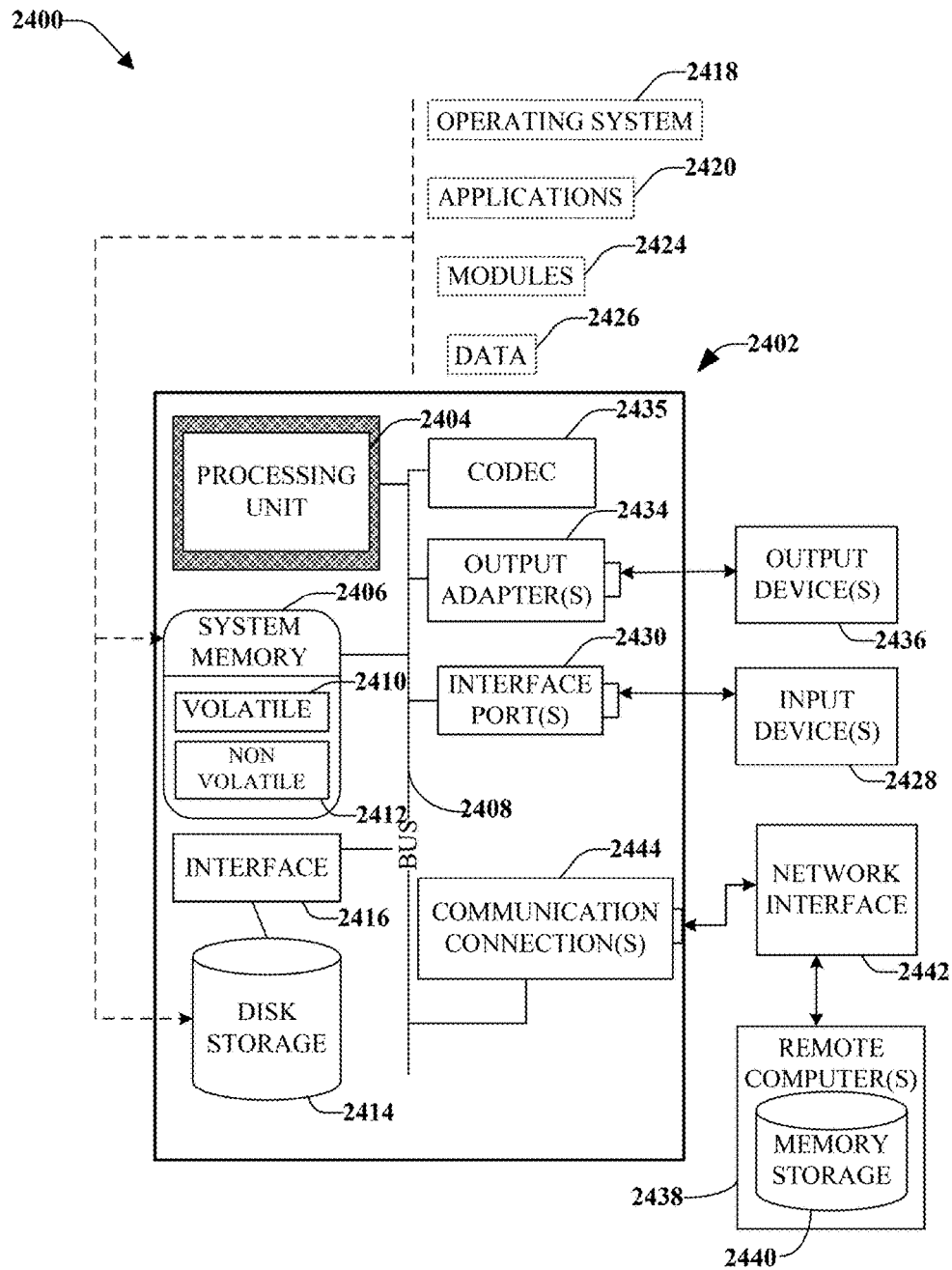
FIG. 24 is a schematic block diagram illustrating a suitable operating environment in accordance with various aspects and embodiments.

With reference to FIG. 24, a suitable environment 2400 for implementing various aspects of the claimed subject matter includes a computer 2402. The computer 2402 includes a processing unit 2404, a system memory 2406, a codec 2405, and a system bus 2408. The system bus 2408 couples system components including, but not limited to, the system memory 2406 to the processing unit 2404. The processing unit 2404 can be any of various available suitable processors. Dual microprocessors and other multiprocessor architectures also can be employed as the processing unit 2404.

The system bus 2408 can be any of several types of suitable bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 24104), and Small Computer Systems Interface (SCSI).

The system memory 2406 includes volatile memory 2410 and non-volatile memory 2412. The basic input/output system (BIOS), containing the basic routines to transfer information between elements within the computer 2402, such as during start-up, is stored in non-volatile memory 2412. In addition, according to present innovations, codec 2405 may include at least one of an encoder or decoder, wherein the at least one of an encoder or decoder may consist of hardware, a combination of hardware and software, or software. Although, codec 2405 is depicted as a separate component, codec 2405 may be contained within non-volatile memory 2412. By way of illustration, and not limitation, non-volatile memory 2412 can include read only memory (ROM), programmable ROM (PROM), electrically programmable ROM (EPROM), electrically erasable programmable ROM (EEPROM), or flash memory. Volatile memory 2410 includes random access memory (RAM), which acts as external cache memory. According to present aspects, the volatile memory may store the write operation retry logic (not shown in FIG. 24) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 2402 may also include removable/non-removable, volatile/non-volatile computer storage medium. FIG. 24 illustrates, for example, disk storage 2414. Disk storage 2414 includes, but is not limited to, devices like a magnetic disk drive, solid state disk (SSD) floppy disk drive, tape drive, Jaz drive, Zip drive, LS-70 drive, flash memory card, or memory stick. In addition, disk storage 2414 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2414 to the system bus 2408, a removable or non-removable interface is typically used, such as interface 2416.

It is to be appreciated that FIG. 24 describes software that acts as an intermediary between users and the basic computer resources described in the suitable operating environment 2400. Such software includes an operating system 2418. Operating system 2418, which can be stored on disk storage 2414, acts to control and allocate resources of the computer system 2402. Applications 2420 take advantage of the management of resources by operating system 2418 through program modules 2424, and program data 2426, such as the boot/shutdown transaction table and the like, stored either in system memory 2406 or on disk storage 2414. It is to be appreciated that the claimed subject matter can be implemented with various operating systems or combinations of operating systems.

A user enters commands or information into the computer 2402 through input device(s) 2428. Input devices 2428 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2404 through the system bus 2408 via interface port(s) 2430. Interface port(s) 2430 include, for example, a serial port, a parallel port, a game port, and a universal serial bus (USB). Output device(s) 2436 use some of the same type of ports as input device(s). Thus, for example, a USB port may be used to provide input to computer 2402, and to output information from computer 2402 to an output device 2436. Output adapter 2434 is provided to illustrate that there are some output devices 2436 like monitors, speakers, and printers, among other output devices 2436, which require special adapters. The output adapters 2434 include, by way of illustration and not limitation, video and sound cards that provide a means of connection between the output device 2436 and the system bus 2408. It should be noted that other devices and/or systems of devices provide both input and output capabilities such as remote computer(s) 2438.

Computer 2402 can operate in a networked environment using logical connections to one or more remote computers, such as remote computer(s) 2438. The remote computer(s) 2438 can be a personal computer, a server, a router, a network PC, a workstation, a microprocessor based appliance, a peer device, a smart phone, a tablet, or other network node, and typically includes many of the elements described relative to computer 2402. For purposes of brevity, only a memory storage device 2440 is illustrated with remote computer(s) 2438. Remote computer(s) 2438 is logically connected to computer 2402 through a network interface 2442 and then connected via communication connection(s) 2444. Network interface 2442 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2444 refers to the hardware/software employed to connect the network interface 2442 to the bus 2408. While communication connection 2444 is shown for illustrative clarity inside computer 2402, it can also be external to computer 2402. The hardware/software necessary for connection to the network interface 2442 includes, for exemplary purposes only, internal and external technologies such as, modems including regular telephone grade modems, cable modems and DSL modems, ISDN adapters, and wired and wireless Ethernet cards, hubs, and routers.

Figure 25:
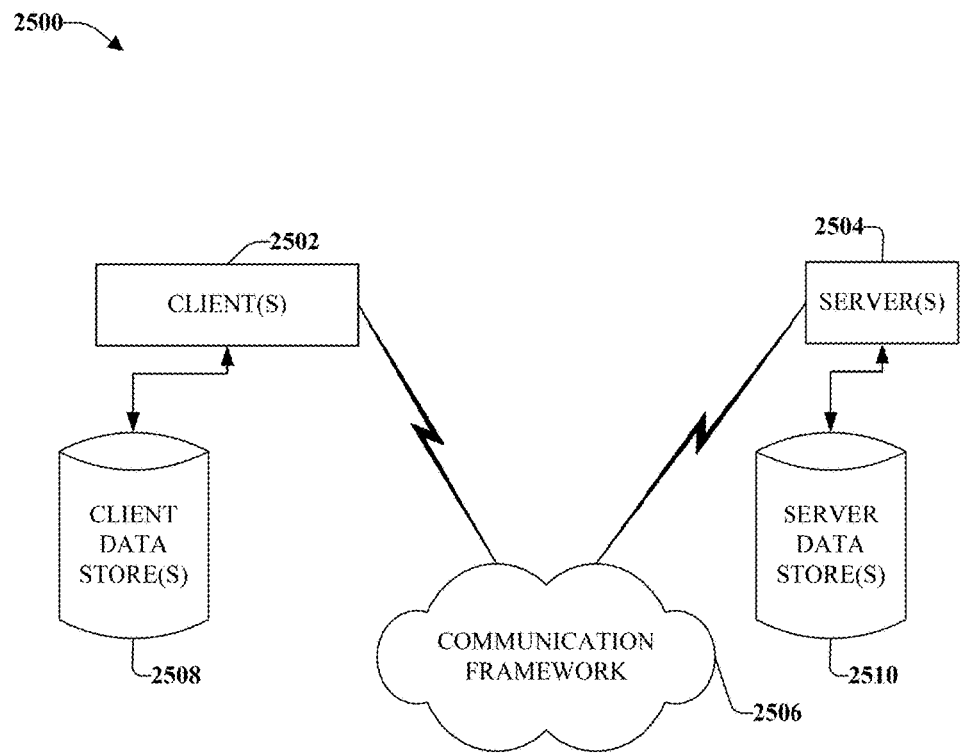
FIG. 25 is a schematic block diagram of a sample-computing environment in accordance with various aspects and embodiments.

Referring now to FIG. 25, there is illustrated a schematic block diagram of a computing environment 2500 in accordance with this disclosure. The system 2500 includes one or more client(s) 2502 (e.g., laptops, smart phones, PDAs, media players, computers, portable electronic devices, tablets, and the like). The client(s) 2502 can be hardware and/or software (e.g., threads, processes, computing devices). The system 2500 also includes one or more server(s) 2504. The server(s) 2504 can also be hardware or hardware in combination with software (e.g., threads, processes, computing devices). The servers 2504 can house threads to perform transformations by employing aspects of this disclosure, for example. One possible communication between a client 2502 and a server 2504 can be in the form of a data packet transmitted between two or more computer processes wherein the data packet may include video data. The data packet can include a metadata, e.g., associated contextual information, for example. The system 2500 includes a communication framework 2506 (e.g., a global communication network such as the Internet, or mobile network(s)) that can be employed to facilitate communications between the client(s) 2502 and the server(s) 2504.

Communications can be facilitated via a wired (including optical fiber) and/or wireless technology. The client(s) 2502 include or are operatively connected to one or more client data store(s) 2508 that can be employed to store information local to the client(s) 2502 (e.g., associated contextual information). Similarly, the server(s) 2504 are operatively include or are operatively connected to one or more server data store(s) 2510 that can be employed to store information local to the servers 2504.

In one embodiment, a client 2502 can transfer an encoded file, in accordance with the disclosed subject matter, to server 2504. Server 2504 can store the file, decode the file, or transmit the file to another client 2502. It is to be appreciated, that a client 2502 can also transfer uncompressed file to a server 2504 and server 2504 can compress the file in accordance with the disclosed subject matter. Likewise, server 2504 can encode video information and transmit the information via communication framework 2506 to one or more clients 2502.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from a computer-readable device or storage media.

What is claimed is:

1. A system, comprising:
   a memory to store information associated with a video; and
   a processor, operatively coupled to the memory, to:
   provide an information card creation interface for presentation to a video owner, the information card creation interface comprising a media player to present the video and an information card user interface (UI) component;
   in response to a selection of the information card UI component by the video owner, provide for presentation to the video owner a plurality of information card formats;
   receive, via the information card creation interface, selections by the video owner of one or more information card formats of the plurality of information card formats for a plurality of information cards for the video, and one or more time parameters for the information associated with the video for the plurality of information cards with respect to the video;
   generate the plurality of information cards based on the selected information card formats and the time parameters received;
   provide a video playback graphical user interface UI for presentation to a viewing user on a mobile device of the viewing user, the video playback graphical user interface comprising a media player to play the video an information icon that is displayed within the media player on the mobile device of the viewing user as an overlay during playing of the video;
   provide a first information card of the plurality of information cards, the first information card comprising first information associated with the video, the first information card being based on a genre of the video, the first information card to be presented at a determined time during playback of the video by the media player on the mobile device of the viewing user in response to a selection of the information icon, the determined time being based on the one or more time parameters;
   provide an information card indicator for presentation prior to the determined time during playback of the video, the information card indicator notifying the viewing user of an option to view the first information card;
   receive a first input from of the viewing user indicating selection of the information icon;
   cause the first information card to be presented within the media player on the mobile device of the viewing user, in response to the first input, wherein the first information card is a graphical element to be presented as an overlay at a position within the media player during playing of the video, the position within the media player being based on an orientation of the mobile device of the viewing user; and
   in response to a second input from the viewing user indicating selection of the graphical element, provide a prompt to be presented within the media player on the mobile device of the viewing user to facilitate an action by the viewing user, the action being associated with the first information card.

2. The system of claim 1, wherein the processor is further to:
   provide a second information card of the plurality of information cards, the second information card comprising second information associated with the video; and
   cause the second information card to be presented within the media player on the mobile device of the viewing user during the playing of the video.

3. The system of claim 2, wherein the first information card is to be presented simultaneously with the second information card during playing of at least a portion of the video.

4. The system of claim 2, wherein the second information card is provided in response to user input indicating selection of the information card indicator.

5. The system of claim 4, wherein the information card indicator is to be presented during a time interval that is shorter than the length of the video.

6. The system of claim 2, wherein the second information is associated with merchandise, and wherein the second information comprises a link to an external source associated with the merchandise.

7. The system of claim 2, wherein the second information card prompts the user to contribute to a project associated with the video from within the media player.

8. The system of claim 2, wherein the second information card comprises a link to another video.

9. The system of claim 2, wherein the second information card comprises a link to a website associated with the video.

10. The system of claim 2, wherein the second information card is provided in response to the second input from the user.

11. The system of claim 2, wherein the second information card is to be presented simultaneously with the first information card during playing of at least a portion of the video.

12. The system of claim 2, wherein the second information card is provided after the rendered first information card is no longer displayed.

13. The system of claim 2, wherein the first information card comprises metadata to be included with the video to be played.

14. The system of claim 1, wherein a flyout from the information icon is to be presented during a time interval that is shorter than a length of the video.

15. A non-transitory computer-readable medium with instructions stored thereon that, when executed by a processor, cause the processor to perform operations comprising:
   providing an information card creation interface for presentation to a video owner, the information card creation interface comprising a media player to present the video and an information card user interface (UI) component;

in response to a selection of the information card UI component by the video owner, providing for presentation to the video owner a plurality of information card formats;

receiving, via the information card creation interface, selections by the video owner of one or more information card formats of the plurality of information card formats for a plurality of information cards for the video, and one or more time parameters for the plurality of information cards with respect to the video;

generating the plurality of information cards based on the selected information card formats and the time parameters received;

providing a video playback graphical user interface for presentation to a viewing user on a mobile device of the viewing user, the video playback graphical user interface comprising a media player to play the video and an information icon that is displayed within the media player on a mobile device of the viewing user as an overlay during playing of the video;

providing a first information card of the plurality of information cards, the first information card comprising first information associated with the video, the first information card being based on a genre of the video, the first information card to be presented at a determined time during playback of the video by the media player on the mobile device of the viewing user in response to a selection of the information icon, the determined time being based on the one or more time parameters;

providing an information card indicator for presentation prior to the determined time during playback of the video, the information card indicator notifying the viewing user of an option to view the first information card;

receiving a first input from of the viewing user indicating selection of the information icon;

causing the first information card to be presented within the media player on the mobile device of the viewing user, in response to the first input, wherein the first information card is a graphical element to be presented as an overlay at a position within the media player during playing of the video, the position within the media player being based on an orientation of the mobile device of the viewing user; and in response to a second input from the viewing user indicating selection of the graphical element, providing a prompt to be presented within the media player on the mobile device of the viewing user to facilitate an action by the viewing user, the action being associated with the first information card.

16. The non-transitory computer-readable medium of claim 15, wherein the first information card comprises metadata to be included with the video.

17. The non-transitory computer-readable medium of claim 15, further comprising:
providing the video and metadata associated with the video in response to a request to play the video.

18. The non-transitory computer-readable medium of claim 15, wherein the first information card is provided in response to a selection of the information card indicator during playing of the video.

19. The non-transitory computer-readable medium of claim 15, further comprising:

receiving text for inclusion in the information card indicator, wherein providing the information card indicator is in response to receiving the text for inclusion in the information card indicator.

20. The non-transitory computer-readable medium of claim 15, wherein the first information card comprises information promoting merchandise associated with the video and a link to an external source associated with the merchandise.

21. The non-transitory computer-readable medium of claim 15, wherein the first information card comprises a link to another video.

22. The non-transitory computer-readable medium of claim 15, wherein the first information card comprises a link to a website associated with the video.

23. The non-transitory computer-readable medium of claim 15, wherein the first information card comprises an interactive survey associated with the video.

24. A method comprising:
providing an information card creation interface for presentation to a video owner, the information card creation interface comprising a media player to present the video and an information card user interface (UI) component;

in response to a selection of the information card UI component by the video owner, providing for presentation to the video owner a plurality of information card formats;

receiving, via the information card creation interface, selections by the video owner of one or more information card formats of the plurality of information card formats for a plurality of information cards for the video, and one or more time parameters for the plurality of information cards with respect to the video;

generating the plurality of information cards based on the selected information card formats and the time parameters received;

providing a video playback graphical user interface for presentation to a viewing user on a mobile device of the viewing user, the video playback graphical user interface comprising a media player to play the video and an information icon that is displayed within the media player on a mobile device of the viewing user as an overlay during playing of the video;

providing a first information card of the plurality of information cards, the first information card comprising first information associated with the video, the first information card being based on a genre of the video, the first information card to be presented at a determined time during playback of the video by the media player on the mobile device of the viewing user in response to a selection of the information icon, the determined time being based on the one or more time parameters;

providing an information card indicator for presentation prior to the determined time during playback of the video, the information card indicator notifying the viewing user of an option to view the first information card;

receiving a first input from of the viewing user indicating selection of the information icon;

causing the first information card to be presented within the media player on the mobile device of the viewing user, in response to the first input, wherein the first information card is a graphical element to be presented as an overlay at a position within the media player during playing of the video, the position within the media player being based on an orientation of the mobile device of the viewing user; and in response to a second input from the viewing user indicating selection of the graphical element, providing a prompt to be presented within the media player on the mobile device of the viewing user to facilitate an action by the viewing user, the action being associated with the first information card.

25. The method of claim 24, further comprising:
providing a second information card comprising second information associated with the video; and
causing the second information card to be presented within the media player on the mobile device of the viewing user during the playing of the video.

26. The method of claim 25, wherein the second information card is provided simultaneously with the first information card during playing of at least a portion of the video.

27. The method of claim 25, wherein the second information card is provided in response to user input indicating selection of the information card indicator from the information icon.

28. The method of claim 27, wherein the information card indicator is to be presented during a time interval that is shorter than a length of the video.

29. The method of claim 27, further comprising determining a level of user engagement with the video during playing of the video, and wherein the information card indicator is provided in response to the level of user engagement being below a threshold level of engagement.

30. The method of claim 25, wherein the second information is associated with merchandise, and wherein the second information comprises a link to an external source associated with the merchandise.

31. The method of claim 25, wherein the second information card comprises a link to another video.

32. The method of claim 25, wherein the second information card comprises a link to a website associated with the video.

33. The method of claim 25, wherein the second information card comprises an interactive survey associated with the video.

34. The method of claim 24, wherein the first information card is provided at the position and orientation that are based on at least one of a type of the on the mobile device of the viewing user or a dimension of the media player on the mobile device of the viewing user.

35. The method of claim 24, further comprising selecting the first information card from the plurality of information cards associated with the video based on at least one of: a preference of the user, a context of the user, or a type of the device.

36. The method of claim 24, wherein the first information card comprises metadata to be included with the video to be played.

* * * * *